US012422769B2

(12) United States Patent
Inagaki et al.

(10) Patent No.: US 12,422,769 B2
(45) Date of Patent: Sep. 23, 2025

(54) STRUCTURE FOR ELECTRICALLY PROTECTING FIXING APPARATUS PROVIDED IN IMAGE FORMING APPARATUS

(71) Applicant: Canon Kabushiki Kaisha, Tokyo (JP)

(72) Inventors: Masaki Inagaki, Shizuoka (JP); Toshiyuki Ichino, Shizuoka (JP); Yuji Fujiwara, Boise, ID (US); Teruhiko Namiki, Shizuoka (JP); Takao Kawazu, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 133 days.

(21) Appl. No.: 18/315,551

(22) Filed: May 11, 2023

(65) Prior Publication Data

US 2023/0393511 A1 Dec. 7, 2023

(30) Foreign Application Priority Data

Jun. 3, 2022 (JP) ................................. 2022-091073

(51) Int. Cl.
*G03G 15/00* (2006.01)
*G03G 15/01* (2006.01)
(Continued)

(52) U.S. Cl.
CPC ..... *G03G 15/5004* (2013.01); *G03G 15/0142* (2013.01); *G03G 15/2017* (2013.01); *G03G 15/2039* (2013.01); *G03G 15/2053* (2013.01); *G03G 15/2057* (2013.01); *G03G 15/80* (2013.01); *G03G 21/1604* (2013.01); *G03G 21/1619* (2013.01); *G03G 21/1652* (2013.01);
(Continued)

(58) Field of Classification Search
CPC ........... G03G 15/0142; G03G 15/2017; G03G 15/2039; G03G 15/2053; G03G 15/2057; G03G 15/5004; G03G 15/80; G03G 21/1604; G03G 21/1619; G03G 21/1652; G03G 21/1685; G03G 2215/00978; H05B 3/22
See application file for complete search history.

(56) References Cited

U.S. PATENT DOCUMENTS

2021/0405558 A1* 12/2021 Yasukawa .......... G03G 15/2053

FOREIGN PATENT DOCUMENTS

JP 5305931 B2 10/2013
JP 2014074770 A 4/2014
(Continued)

*Primary Examiner* — Joseph S Wong
(74) *Attorney, Agent, or Firm* — Venable LLP

(57) ABSTRACT

A metal frame provides a ground potential. An image forming unit forms a toner image on a sheet. A fixing apparatus fixes the toner image on the sheet. The fixing apparatus comprises a heating element for generating heat by being supplied with power from an alternating current power source. An insulating layer covers the heating element. A conductive layer contacts the insulating layer and insulated from the metal frame. A tube-shaped member is heated by the heating element. A pressing member is arranged opposing the tube-shaped member and forms a nip portion in cooperation with the tube-shaped member. A capacitive element whose one end is connected to the metal frame and whose other end is connected to the conductive layer of the fixing apparatus.

1 Claim, 16 Drawing Sheets

(51) Int. Cl.

| | |
|---|---|
| ***G03G 15/20*** | (2006.01) |
| ***G03G 21/16*** | (2006.01) |
| ***H05B 3/22*** | (2006.01) |

(52) U.S. Cl.

CPC ........... *G03G 21/1685* (2013.01); *H05B 3/22* (2013.01); *G03G 2215/00978* (2013.01)

(56) References Cited

FOREIGN PATENT DOCUMENTS

| | | | |
|---|---|---|---|
| JP | 2018072512 | A | 5/2018 |
| JP | 2020122914 | A | 8/2020 |

* cited by examiner

STRUCTURE FOR ELECTRICALLY PROTECTING FIXING APPARATUS PROVIDED IN IMAGE FORMING APPARATUS

BACKGROUND OF THE INVENTION

Field of the Invention

The present disclosure relates to a structure for electrically protecting a fixing apparatus provided in an image forming apparatus.

Description of the Related Art

Generally, a fixing apparatus includes an endless belt (also referred to as a fixing film), a plate-shaped heater that contacts an inner surface of the endless belt, and a pressing roller forming a nip portion in cooperation with the heater via the endless belt. An alternating current supplied from a commercial alternating current power source is applied to the heater, and so the heater may be subject to an excessive voltage due to a lightning surge or the like. An excessive voltage may damage an insulating member (insulating layer) present between the heater and a core metal of the pressing roller. Japanese Patent No. 5305931 (hereinafter "PTL1") proposes protecting a fixing apparatus from an excessive voltage by connecting a capacitor between a core metal of a pressing roller and a metal frame constituting the image forming apparatus.

In PTL1, an electrostatic capacitance is also generated between the heater and the core metal of the pressing roller. A distance between the heater and the core metal of the pressing roller is large, and so, this electrostatic capacitance is insufficient against an excessive voltage. Also, the pressing roller includes an elastic layer, and so, the electrostatic capacitance between the heater and the core metal of the pressing roller tends to vary. As a result, a potential of a fixing film also varies. Considering this variation, it is necessary to maintain a sufficient creepage distance and clearance distance between the fixing film and the metal frame, making it difficult to downsize the image forming apparatus.

SUMMARY OF THE INVENTION

The present disclosure provides an image forming apparatus comprising: a metal frame configured to provide a ground potential; an image forming unit configured to form a toner image on a sheet; a fixing apparatus configured to fix the toner image on the sheet, the fixing apparatus comprising: a heating element configured to generate heat by being supplied with power from an alternating current power source; an insulating layer covering the heating element; a conductive layer contacting the insulating layer and insulated from the metal frame; a tube-shaped member configured to be heated by the heating element; and a pressing member arranged opposing the tube-shaped member and configured to form a nip portion in cooperation with the tube-shaped member; and a capacitive element whose one end is connected to the metal frame and whose other end is connected to the conductive layer of the fixing apparatus.

Further features of the present invention will become apparent from the following description of exemplary embodiments (with reference to the attached drawings).

DESCRIPTION OF THE EMBODIMENTS

Figure 1:
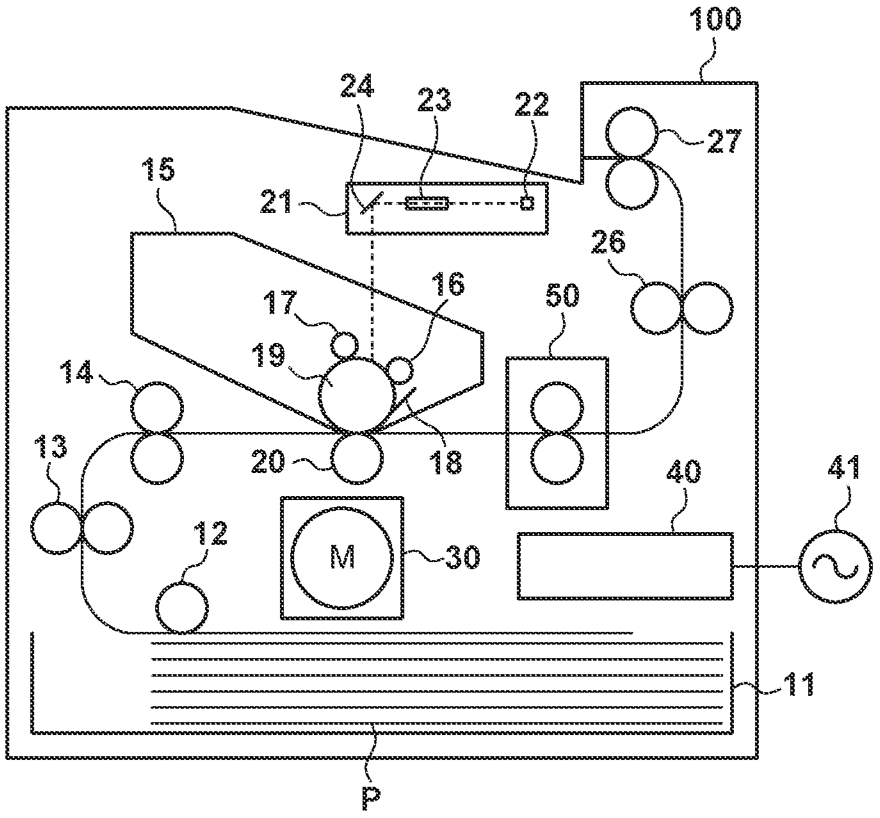
FIG. 1 is a diagram for explaining an image forming apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

[Structure of Image Forming Apparatus]

As illustrated in FIG. 1, an image forming apparatus 100 is a printer for forming an image on a sheet P using an electrophotographic printing technique. The image forming apparatus 100 may be realized as a copy machine, a multifunction peripheral, or a facsimile apparatus.

A photosensitive member 19 is an image carrier that rotates while carrying an electrostatic latent image and a toner image. A charging roller 16 uniformly charges a surface of the photosensitive member 19. A scanner unit 21 includes a laser light source 22, a rotating polygon mirror 23, and a reflecting mirror 24. The laser light source 22 outputs laser light modulated according to image information. The rotating polygon mirror 23 deflects the laser light while rotating. The reflecting mirror 24 deflects the laser light to the photosensitive member 19. An electrostatic latent image is thus formed on the surface of the photosensitive member 19.

A process cartridge 15 is a replaceable, consumable component including the photosensitive member 19, the charging roller 16, a developing roller 17, and a cleaning member 18. The developing roller 17 forms a toner image by developing an electrostatic latent image using toner.

A feeding cassette 11 is a container for storing a plurality of sheets P. A pickup roller 12 feeds the sheets P one at a time from the feeding cassette 11. Conveyance rollers 13 are provided on a downstream side of the pickup roller 12 in a conveyance direction of the sheet P and convey the sheet P to registration rollers 14. The registration rollers 14 correct skewing of the sheet P and convey the sheet P such that a timing at which a toner image arrives at a transfer position and a timing at which the sheet P arrives at the transfer position coincide with each other.

The transfer position is a transfer nip formed by the photosensitive member 19 and a transfer roller 20. The toner image is transferred from the photosensitive member 19 to the sheet P by the transfer roller 20 and the photosensitive member 19 conveying the sheet P while nipping the sheet P. The sheet P is then conveyed to a fixing apparatus 50. The cleaning member 18 cleans the photosensitive member 19 by removing toner remaining on the photosensitive member 19.

The fixing apparatus 50 fixes the toner image to the sheet P by applying heat and pressure to the sheet P and the toner image. Conveyance rollers 26 and 27 are provided on a downstream side of the fixing apparatus 50. The conveyance rollers 26 and 27 discharge the sheet P after it has passed through the fixing apparatus 50 out of the image forming apparatus 100.

A motor 30 is a driving source for driving the fixing apparatus 50 and the like. The conveyance speed of the sheet P is proportional to a rotational speed of the motor 30. A power supply circuit 40 is connected to a commercial alternating current power source 41 and supplies power supplied from the commercial alternating current power source 41 to the fixing apparatus 50. The photosensitive member 19, the charging roller 16, the scanner unit 21, the developing roller 17, and the transfer roller 20 form an image forming unit for forming an image on the sheet P.

The image forming apparatus 100 can form an image on a plurality of different sizes of sheet P. The feeding cassette 11 can store, for example, Letter paper (about 216 mm×279 mm) and Legal paper (about 216 mm×356 mm). The feeding cassette 11 can also store A4 paper (210 mm×297 mm), Executive paper (about 184 mm×267 mm), JIS B5 paper (182 mm×257 mm), and A5 paper (148 mm×210 mm). JIS is an abbreviation for Japanese Industrial Standards. Basically, the image forming apparatus 100 vertically feeds the sheet P (conveys the sheet P such that a long side of the sheet P is parallel to the conveyance direction). However, the embodiment is also applicable to a printer in which the sheet P is laterally fed (the sheet P is conveyed such that a short side of the sheet P is parallel to the conveyance direction). The sheets P with the largest widths among standard sheets P (nominal sheet P width) that can be loaded on the image forming apparatus 100 are Letter paper and Legal paper. The widths thereof are approximately 216 mm. A sheet P whose size is smaller than the sheet P of the maximum size that can be loaded on the image forming apparatus 100 may be referred to as a small-sized sheet.

[Structure of Fixing Apparatus]

Figure 2:
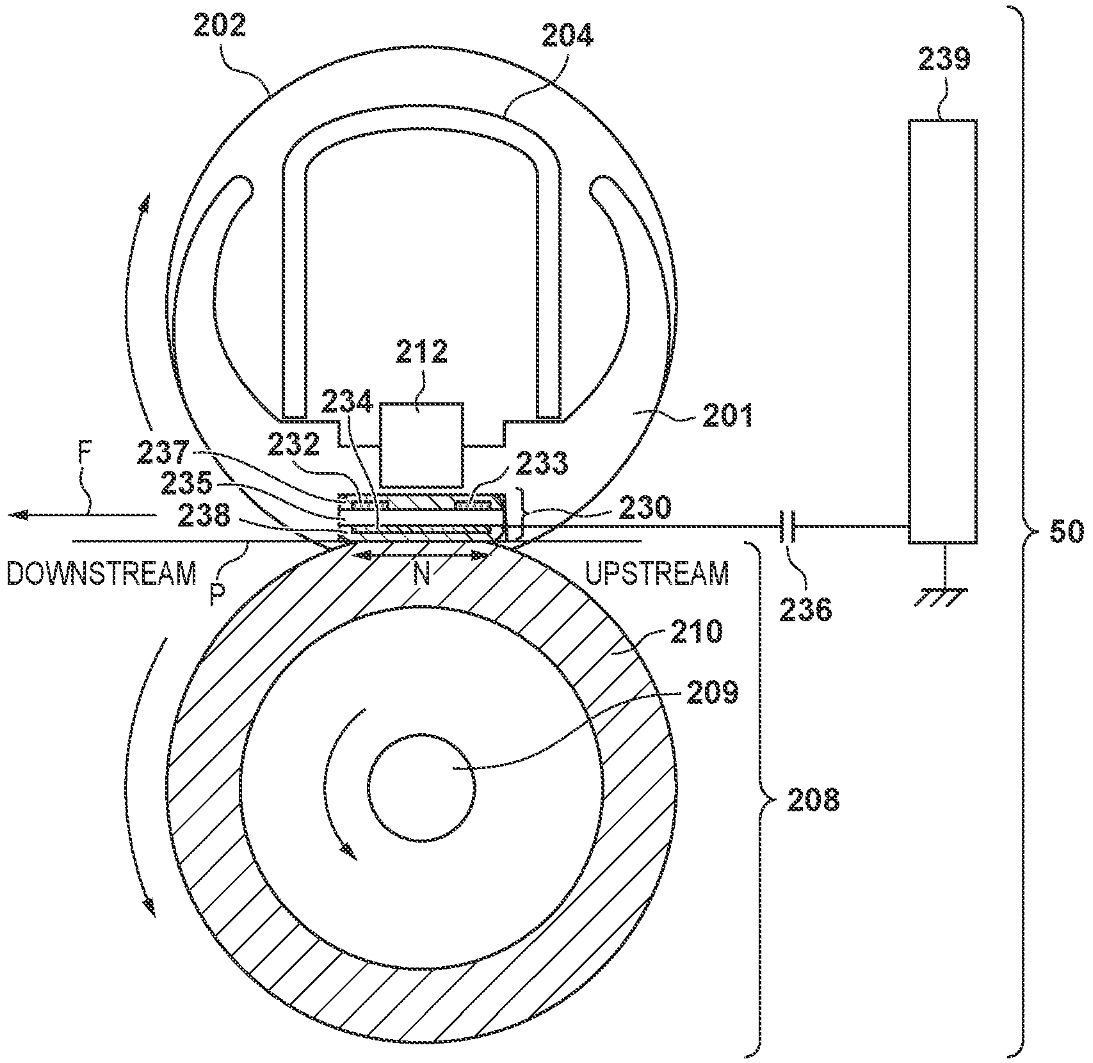
FIG. 2 is a diagram for explaining a fixing apparatus of a first embodiment.

FIG. 2 is a cross-sectional view of the fixing apparatus 50. An arrow F indicates the conveyance direction of the sheet P. A film 202 is a flexible tube-shaped film (endless belt). A heater 230 is arranged to contact an inner circumferential surface of the film 202 and heats the film 202. A pressing roller 208 is a nip portion forming member forming a fixing nip portion N in cooperation with the film 202 and the heater 230. A material of a base layer of the film 202 is, for example, heat-resistant resin, such as polyimide, or metal, such as stainless steel. A surface layer of the film 202 may, for example, include an elastic layer, such as heat-resistant rubber. The heater 230 is held by a holding member 201 made of heat-resistant resin. The holding member 201 also includes a guide function for guiding the rotation of the film 202. A metal stay 204 is a metal stay for applying the pressure of a spring (not illustrated) to the holding member 201. A safety element 212 is a thermal switch or a thermal fuse that is activated by abnormal heating of the heater 230 and cuts off the power to be supplied to the heater 230. The safety element 212 is in direct contact with the heater 230 or is in indirect contact with the heater 230 via the holding member 201.

The pressing roller 208 includes a core metal 209 of a metal material, such as iron or aluminum, and an elastic layer 210 of a material, such as silicone rubber. The pressing roller 208 rotates in an arrow direction when a driving force is received from the motor 30. By the pressing roller 208 rotating, the film 202 rotates following the pressing roller 208. The sheet P, carrying an unfixed toner image, is heated while being nipped and transported by the fixing nip portion N.

In FIG. 2, the heater 230 includes a back surface (non-sliding surface) and a front surface (sliding surface). The back surface is a surface contacting the holding member 201. The front surface is a surface opposing the pressing roller 208. The heater 230 includes a ceramic substrate 235, which is an insulating member. Resistance heating elements 232 and 233 are provided on a back surface side of the substrate 235. The resistance heating element 233 is provided on an upstream side and the resistance heating element 232 is provided on a downstream side in the conveyance direction of the sheet P. A surface protective layer 237 is glass for covering and insulating the resistance heating elements 232 and 233.

A conductor 234 is provided on a sliding surface side of the substrate 235. The conductor 234 is a conductive layer formed across substantially the entire sliding surface of the substrate 235. A terminal (not illustrated) connected to the conductor 234 is provided at a longitudinal end portion of the substrate 235. A capacitor 236 is arranged in the fixing apparatus 50. One end of the capacitor 236 is connected to the conductor 234. The other end of the capacitor 236 is connected to a frame ground 239. The frame ground 239 is a metal frame connected to an electrical ground of the image forming apparatus 100. A surface protective layer 238 is glass for protecting the conductor 234 and improving a sliding property of the fixing nip portion N.

In the image forming apparatus described in PTL1, dielectric breakdown of an insulating layer caused by an excessive voltage, such as a lightning surge, is suppressed without upsizing the fixing apparatus, by connecting a capacitor between the pressing roller and the frame ground (FG), thereby protecting the fixing apparatus. However, a shaft (core metal) of the pressing roller is connected to the frame ground via the capacitor, and so, the distance from a resistance heating element to the core metal of the pressing roller tends to be large. As a result, an electrostatic capacitance formed between the resistance heating element and the pressing roller (hereinafter, referred to as the electrostatic capacitance of the pressing roller) is small. The pressing roller includes an elastic layer. Therefore, the electrostatic capacitance of the pressing roller tends to vary greatly depending on the variation in a thickness of the elastic layer and the deformation of the elastic layer. That is, when an excessive voltage occurs, a potential of the fixing film varies. Considering this variation in the potential, it is necessary to increase the creepage distance and the clearance distance between the fixing film and the frame ground. As a result, it is difficult to downsize the fixing apparatus and the image forming apparatus. That is, there is room to further downsize the fixing apparatus of PTL1.

Therefore, in the present embodiment, a connection destination of the capacitor 236 connected to the frame ground 239 is changed from the core metal 209 to the conductor 234 provided on the sliding surface side of the substrate 235. This makes it possible to easily downsize the fixing apparatus 50 and the image forming apparatus 100.

Figure 3:
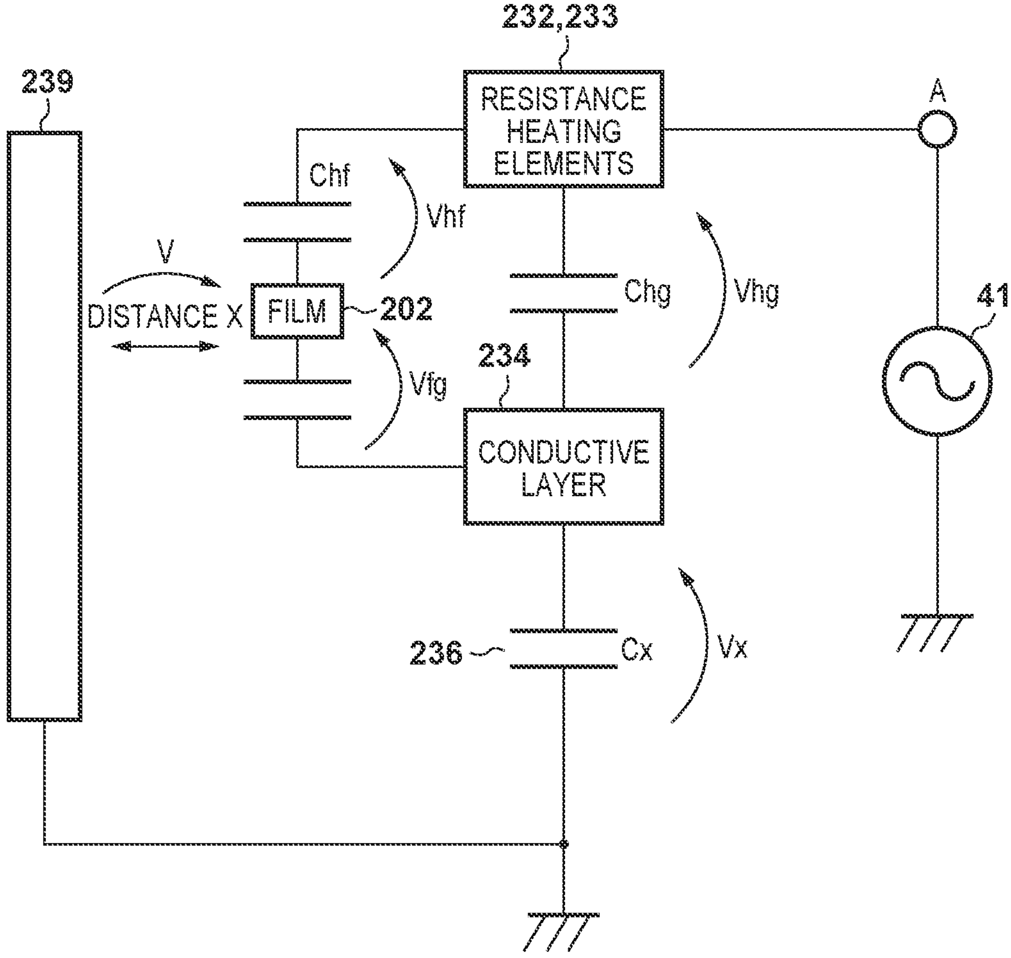
FIG. 3 is a diagram for explaining an equivalent circuit of the fixing apparatus of the first embodiment.

FIG. 3 illustrates an electrical equivalent circuit of the fixing apparatus 50. An electrostatic capacitance Chf is present between the resistance heating elements 232 and 233 and the film 202. An electrostatic capacitance Cfg is present between the film 202 and the conductor 234. An electrostatic capacitance Chg is present between the resistance heating elements 232 and 233 and the conductor 234. An electrostatic capacitance of the capacitor 236 connected between the conductor 234 and the frame ground 239 is Cx.

When an excessive voltage Vsurge is applied to an A point, the excessive voltage Vsurge is divided by the electrostatic capacitances Chf, Cfg, Chg, and Cx. As a result, voltages Vhg, Vhf, Vfg, and V become lower than the excessive voltage Vsurge. Here, the voltage Vhg is a voltage between the resistance heating elements 232 and 233 and the conductor 234. The voltage Vhf is a voltage between the resistance heating elements 232 and 233 and the film 202. The voltage Vfg is a voltage between the film 202 and the conductor 234. The voltage V is a voltage between the film 202 and the frame ground 239. As described above, the voltage V between the frame ground 239 and the film 202 becomes lower than the excessive voltage Vsurge, and so, a distance x can be shortened.

Furthermore, the conductor 234 is arranged in a vicinity of the resistance heating elements 232 and 233 and the film 202. Therefore, the electrostatic capacitance Cfg between the film 202 and the conductor 234 and the electrostatic capacitance Chg between the resistance heating elements 232 and 233 and the conductor 234 are increased, and thereby the effect of the variation in the thickness of the elastic layer 210 is reduced. Meanwhile, a thickness of the substrate 235 and a thickness of the surface protective layer 238 tend not to change. Therefore, a variation in the electrostatic capacitance Cfg between the film 202 and the conductor 234 and a variation in the electrostatic capacitance Chg between the resistance heating elements 232 and 233 and the conductor 234 are small.

Accordingly, it becomes possible to shorten the creepage distance and the clearance distance, which are kept so as to prevent electric discharge from the film 202 to the frame ground 239 from occurring when the excessive voltage Vsurge occurs, over what was conventional. This makes it possible to downsize the fixing apparatus 50 and the image forming apparatus 100 while maintaining the capability to protect the fixing apparatus 50.

In the present embodiment, the capacitor 236 is arranged in the fixing apparatus 50; however, this is only one example. The capacitor 236 may be arranged on a substrate (not illustrated) provided outside the fixing apparatus 50. In this case, the capacitor 236 is electrically connected to the conductor 234 via a bundle of lines. This reduces the components in the fixing apparatus 50, making it possible to further downsize the fixing apparatus 50.

In the present embodiment, the resistance heating elements 232 and 233 are arranged on a back surface of the substrate 235, and the conductor 234 is arranged on a front surface; however, this is only one example. The conductor 234 may be arranged on the back surface, and the resistance heating elements 232 and 233 may be arranged on the front surface. Details of this structure will be described later.

[Structure of Heater]

Figure 4A:
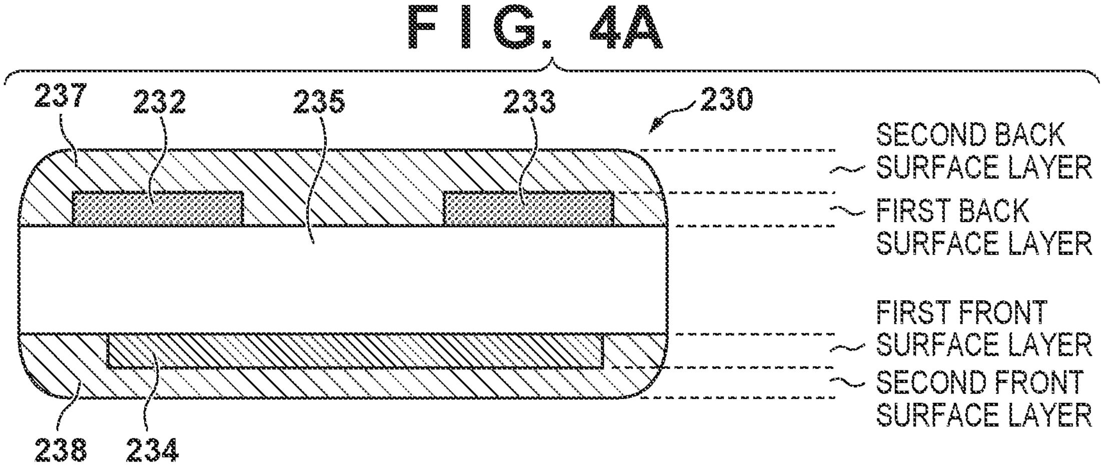
FIGS. 4A and 4B are diagrams for explaining a structure of a heater of the first embodiment.
Figure 4B:
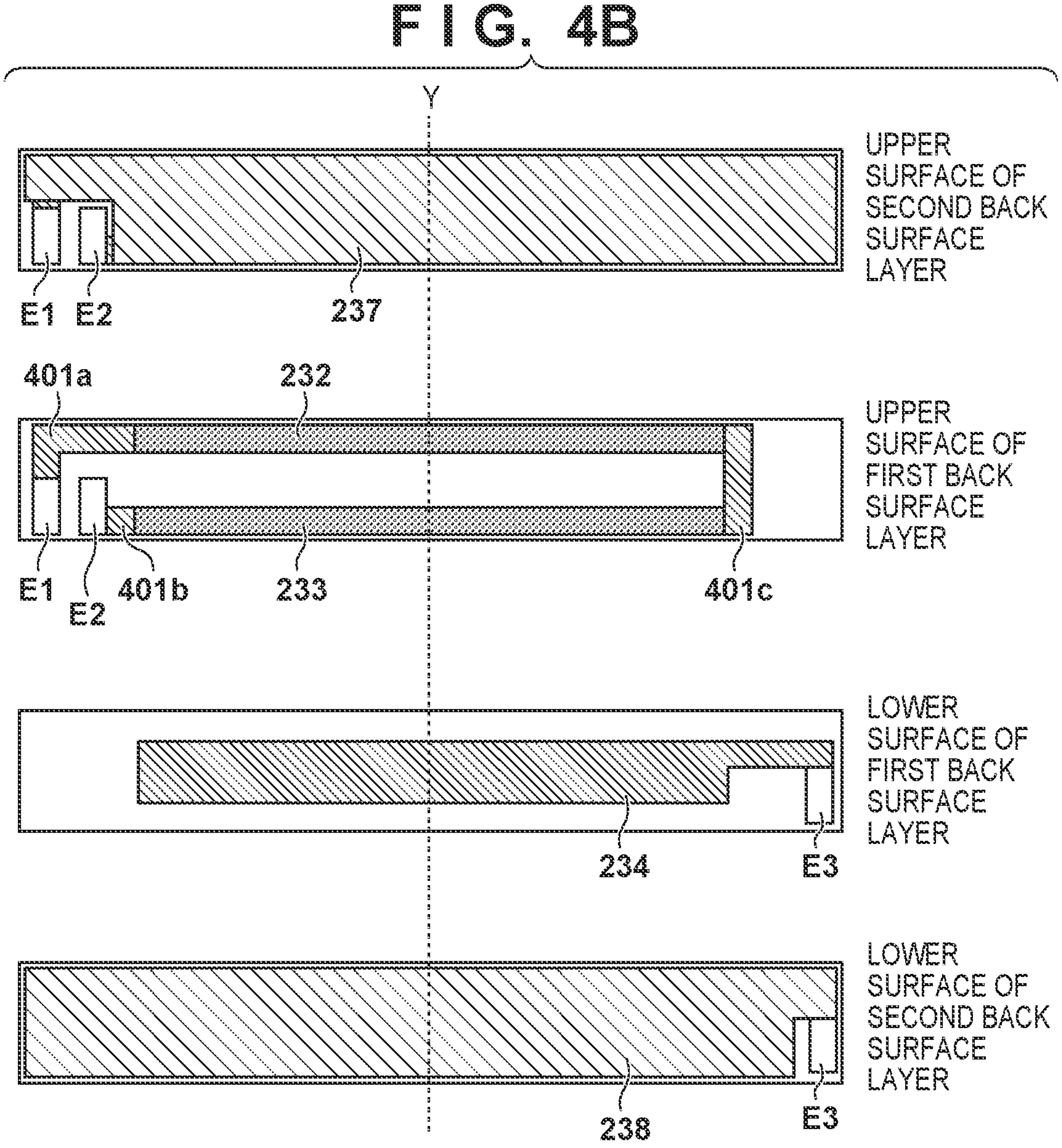

FIGS. 4A and 4B illustrate a structure of the heater 230. FIG. 4A is a cross-sectional view for when the heater 230 is cut at a conveyance reference position Y illustrated in FIG. 4B. FIG. 4B is a plan view for explaining a longitudinal structure of the heater 230. In FIG. 4B, an upper surface of a first back surface layer and an upper surface of a second back surface layer indicate an upper surface of the respective layers for when the heater 230 is observed from above. A lower surface of a first front surface layer and a lower surface of a second front surface layer indicate a lower surface of the respective layers when the heater 230 is observed from below. The conveyance reference position Y coincides with a center in a width direction of the sheet P (a direction perpendicular to the conveyance direction). The sheet P is conveyed by being centered such that the center of the sheet P coincides with the conveyance reference position Y, independent of a difference in size.

As illustrated in FIG. 4A, the first back surface layer of the heater 230 includes the resistance heating element 232 and the resistance heating element 233 provided on the substrate 235. The second back surface layer of the heater 230 includes the insulating surface protective layer 237 formed so as to cover the resistance heating element 232 and the resistance heating element 233. The first front surface layer of the heater 230 includes the conductor 234 formed on the substrate 235. Further, the second front surface layer of the heater 230 includes the insulating surface protective layer 238 formed so as to cover the conductor 234. The surface protective layer 237 is in the space between the resistance heating element 232 and the resistance heating element 233 and at each end portion thereof, in the first back surface layer. Similarly, the surface protective layer 238 is at each end portion of the conductor 234 in the first front surface layer. The surface protective layers 237 and 238 are, for example, glass.

As illustrated in FIG. 4B, the first back surface layer of the heater 230 is provided with the resistance heating element 232, the resistance heating element 233, an electrode E1, and an electrode E2. A conductor 401*a* electrically connects the electrode E1 and one end of the resistance heating element 232. A conductor 401*b* electrically connects the electrode E2 and one end of the resistance heating element 233. A conductor 401*c* electrically connects the other end of the resistance heating element 232 and the other end of the resistance heating element 233. The electrodes E1 and E2 are provided on one longitudinal end side of the substrate 235.

In the second back surface layer of the heater 230, the insulating surface protective layer 237 covers the resistance heating elements 232 and 233 and the conductors 401*a* to 401*c*, excluding the electrode E1 and the electrode E2. The electrode E1 and the electrode E2 are not covered by the surface protective layer 237 and are exposed.

The first front surface layer of the heater 230 includes the conductor 234 formed on the sliding surface side of the substrate 235 and an electrode E3. The conductor 234 and the electrode E3 for power supply are directly connected.

Further, the second front surface layer of the heater 230 includes the insulating surface protective layer 238 formed so as to expose the electrode E3 and cover the conductor 234.

[Power Supply Circuit]

Figure 5:
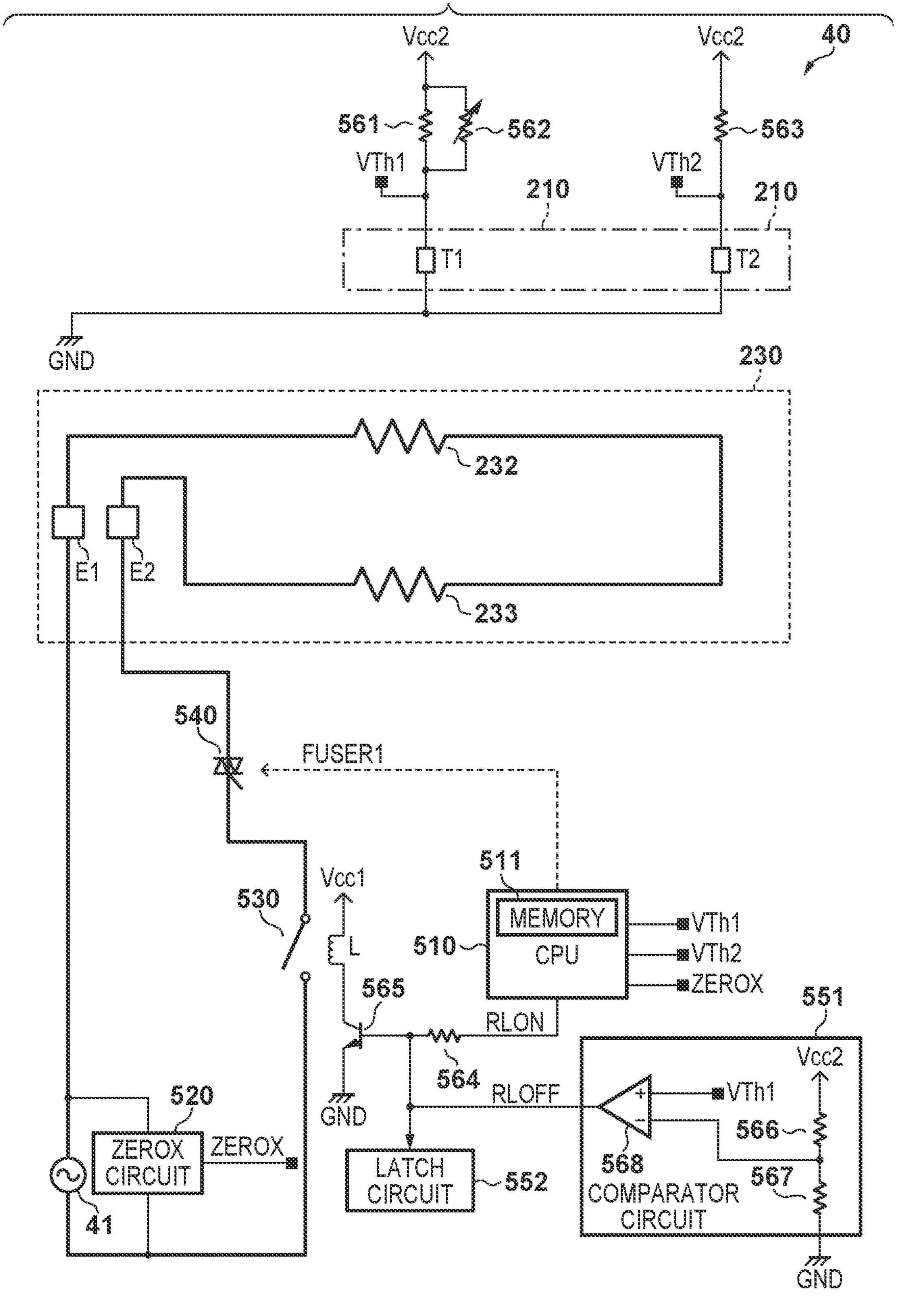
FIG. 5 is a diagram for explaining a power supply circuit (control circuit) of the first embodiment.

FIG. 5 illustrates the power supply circuit 40 of the first embodiment. The resistance heating element 232 and the resistance heating element 233 constituting the heater 230 are electrically connected to the power supply circuit 40 via the electrode E1 and the electrode E2 provided in the heater 230. A power source voltage Vcc1 and a power source voltage Vcc2 are DC voltages generated by an AC/DC converter (not illustrated) connected to the commercial alternating current power source 41. AC is an abbreviation of alternating current. DC is an abbreviation of direct current. The commercial alternating current power source 41 is connected to the heater 230 via a relay 530 and a TRIAC 540. The TRIAC 540 is controlled to be on/off by a control signal FUSER1 from a CPU 510. A driving circuit of the TRIAC 540 is not illustrated. A zero cross circuit 520 generates the ZEROX signal according to a zero cross timing of the commercial alternating current power source 41 and inputs the ZEROX signal to the CPU 510. The zero cross circuit 520 is insulated within. For example, in the zero cross circuit 520, reinforced insulation may be applied between a primary side circuit connected to the commercial alternating current power source 41 and a secondary side circuit for outputting a ZEROX signal.

Thermistors T1 and T2 form a temperature detection circuit. A detected voltage VTh1 of the thermistor T1 is generated by dividing the power source voltage Vcc2 by a resistance of the thermistor T1 and a combined resistance of a pull-up resistor 561 and a variable resistor 562. A detected voltage VTh2 of the thermistor T2 is generated by dividing the power source voltage Vcc2 by a resistance of the thermistor T2 and a resistance of a pull-up resistor 563. The detected voltage VTh1 and the detected voltage VTh2 are inputted to the CPU 510. The CPU 510 includes a memory 511. The CPU 510 converts the detected voltage VTh1 and the detected voltage VTh2 to temperatures according to information stored in the memory 511.

The thermistor T1 is used as a temperature sensor for controlling the temperature of the heater 230. The CPU 510 calculates the power to be supplied to the heater 230 by control (e.g., PI control) based on a set target temperature and the temperature detected by the thermistor T1. The CPU 510 performs conversion into a control level of a phase angle (phase control) and a wavenumber (wavenumber control) corresponding to the calculated power. PI is an abbreviation for proportional-integral. The CPU 510 controls the TRIAC 540 according to the zero cross timing of the commercial alternating current power source 41 detected by the zero cross circuit 520 and the control level. Thus, the temperature detected by the thermistor T1 is maintained at the target temperature. The thermistor T2 serves a supplementary role. For example, when a temperature detected by the thermistor T2 is greater than or equal to a preset threshold temperature, the CPU 510 reduces a conveyance speed of the sheet P. That is, the CPU 510 reduces the rotational speed of the motor 30. Thus, an excessive rise in the temperature of a longitudinal end portion (a non-sheet passing area) of the heater 230 is suppressed.

Next, an operation of the relay 530 will be described. When the CPU 510 causes an RLON signal to enter a high state, the RLON signal causes a transistor 565 to turn on via a resistor 564. Thus, a current flows from the power source voltage Vcc1 to a secondary side coil L of the relay 530, and a primary side contact of the relay 530 enters an on state. When the RLON signal enters a low state, the transistor 565 enters an off state. Thus, a current flowing from the power source voltage Vcc1 to the secondary side coil L of the relay 530 is cut off, and the primary side contact of the relay 530 enters an off state.

Next, an operation of a safety circuit in which the relay 530 is used will be described. A comparator circuit 551 includes a resistor 566 and a resistor 567, which generate a reference voltage (threshold voltage). The resistor 566 and the resistor 567 generate the threshold voltage by dividing the power source voltage Vcc2. The threshold voltage is a voltage that corresponds to a temperature (threshold temperature) that is not reached during normal printing and at which the heater 230 can be safely stopped in response to an excessive rise in the temperature of the heater 230. The threshold voltage is determined by a ratio of voltage division between the resistor 566 and the resistor 567. A comparator 568 compares the threshold voltage and the detected voltage VTh1 of the thermistor T1. When the detected voltage VTh1 is less than the threshold voltage, an RLOFF signal outputted from the comparator 568 is in a high level state. When the detected voltage VTh1 is greater than or equal to the threshold voltage, some sort of an abnormality has occurred in the energization of the heater 230.

Therefore, the comparator 568 sets the RLOFF signal to a low state. A latch circuit 552 latches the RLOFF signal to a low state. When the RLOFF signal is latched to a low state, the transistor 565 is kept in an off state even if the CPU 510 sets the RLON signal to a high state. As a result, the relay 530 is forced to remain in an off state (safe state). As described above, when an abnormal state caused by a malfunction of the CPU 510, a failure of the TRIAC 540, or the like occurs, the relay 530 also functions as a power cut-off circuit for suppressing an excessive rise in the temperature of the heater 230.

Incidentally, the thermistor T1 has manufacturing variation (individual variability). Therefore, the resistance of the thermistor T1 at a given temperature is different for each individual thermistor T1. The greater the manufacturing variation, the greater the detected voltage of the thermistor T1 deviates from an ideal value. Therefore, it is problematic to employ a thermistor T1 whose manufacturing variation is large in a safety circuit (the comparator circuit 551).

In the present embodiment, the thermistor T1 and the thermistor T2 include a mechanism for correcting individual variability. In particular, hardware correction is applied to the thermistor T1 and software correction is applied to the thermistor T2. Thus, the effect of manufacturing variation of the thermistor T1 and the thermistor T2 is reduced.

Hardware Correction

The detected voltage VTh1 of the thermistor T1 is expressed by Equation (1). Here, it is assumed that there is no variable resistor 562.

$$VTh1=Vcc2\times RT1/(RT1+R561) \quad (1)$$

Here, RT1 is the resistance of the thermistor T1. R561 is the resistance of the resistor 561.

The thermistor T1 has manufacturing variation. When the thermistor T1 whose manufacturing variation is large is mounted, a deviation between an actual temperature of the heater 230 and a temperature recognized by the CPU 510 increases. Therefore, an amount of supplied power becomes too large or too small with respect to the power required by the heater 230 while the image forming apparatus 100 is printing. Furthermore, a deviation between the actual temperature and the detected temperature of the heater 230 increases also in the above-described safety circuit in which the relay 530 is used. Therefore, a case where the relay 530 cannot be cut off when the actual temperature of the heater 230 reaches an expected temperature may occur. The detected voltage VTh1 at a given temperature should be constant regardless of the manufacturing variation of the thermistor T1 mounted on the heater 230. Therefore, in the present embodiment, hardware correction is applied to the thermistor T1.

By connecting the variable resistor 562 in parallel with the pull-up resistor 561, the detected voltage VTh1 is expressed by Equation (2).

$$VTh1=Vcc2/(1+R561\times R562/(RT1(R561+R562))) \quad (2)$$

Here, R562 is the resistance of the variable resistor 562.

For example, in the manufacturing process of the fixing apparatus 50, a resistance RT1 of the thermistor T1 at a predetermined temperature is measured in advance, and the resistance RT1 is stored in the memory 511 of the CPU 510. The CPU 510 adjusts the variable resistor 562 using the resistance RT1 so that an ideal voltage VTh1 at a given temperature is obtained. By thus adjusting the variable resistor 562, the detected voltage VTh1 at a predetermined temperature is made to be always constant regardless of the manufacturing variation of the mounted thermistor T1. Here, it is assumed that the variations of the power source voltage Vcc2 and the resistor 561 are very small compared to the manufacturing variation of the thermistor T1.

In the present embodiment, since the thermistor T1 can accurately detect the actual temperature of the heater 230, an appropriate power is supplied to the heater 230. Furthermore, even if some sort of an abnormality occurs and the temperature of the heater 230 increases excessively, the comparator circuit 551 will operate properly. This is because there is almost no deviation between the actual temperature of the heater 230 and the detected temperature inputted to the comparator circuit 551. This makes it possible for the relay 530 to cut off the energization of the heater 230 when an excessive rise in the temperature of the heater 230 is detected. The adjustment of the variable resistor 562 may be performed manually when the fixing apparatus 50 is shipped from the factory.

Software Correction

Software correction is applied to the thermistor T2. In the manufacturing process of the fixing apparatus 50, a resistance RT2 of the thermistor T2 at a predetermined temperature is measured in advance, and a deviation amount D is stored in the memory 511 of the CPU 510. The deviation amount D is a difference between the resistance RT2 and a resistance RT2ref of the thermistor T2, which is a reference. The CPU 510 obtains a detected value VTh2AD by converting the detected voltage VTh2 of the thermistor T2 from analog to digital. The CPU 510 corrects the detected value VTh2AD using the deviation amount D read out from the memory 511. The detected voltage VTh2 of the thermistor T2 is expressed by Equation (3).

$$VTh2=Vcc2\times RT2/(RT2+R563) \quad (3)$$

Here, RT2 is the resistance of the thermistor T2. R563 is the resistance of the resistor 563. The thermistor T2 also has manufacturing variation, similarly to the thermistor T1. Therefore, when the thermistor T2 whose manufacturing variation is large is mounted, a deviation between the actual temperature of the heater 230 and the temperature recognized by the CPU 510 increases.

In one example, the CPU 510 processes the detected voltage VTh2 with 10 bits. In this case, the detected value VTh2AD is expressed by Equation (4).

$$VTh2AD=VTh2\times 1023/Vcc2 \quad (4)$$

Meanwhile, the detected voltage VTh2 includes the effect of the manufacturing variation of the thermistor T2.

When the detected voltage VTh2 is corrected by the deviation amount D, Equation (5) is obtained.

$$VTh2=Vcc2\times D\times RT2\text{ref}/(D\times RT2\text{ref}+R563) \quad (5)$$

Furthermore, when Equation (5) is substituted into Equation (4), Equation (6) is obtained.

$$VTh2AD=(D\times RT2\text{ref}/(D\times RT2\text{ref}+R563))\times 1023 \quad (6)$$

Here, RT2ref is expressed by Equation (7).

$$RT2\text{ref}=VTh2AD\times R563/(D\times(1023-VTh2AD)) \quad (7)$$

Therefore, a corrected detected value is expressed by Equation (8).

$$VTh2AD'=(VTh2AD/((1-D)VTh2AD+1023\times D))\times 1023 \quad (8)$$

The CPU 510 can calculate a detected value VTh2AD' corrected based on the detected value VTh2AD and the deviation amount D. Temperature correction is thus realized using the deviation amount D obtained in the manufacturing process of the fixing apparatus 50 and the detected value VTh2AD obtained by the CPU 510. The effect of the manufacturing variation can be reduced regardless of the manufacturing variation of the mounted thermistor T2. That is, a deviation between the actual temperature of the heater 230 and a detected temperature recognized by the CPU 510 will be sufficiently small.

Software correction is a method of correcting the detected value VTh2AD of the detected voltage VTh2 by internal calculation of the CPU 510. Therefore, the detected voltage VTh2 is not directly corrected. Meanwhile, the detected voltage VTh1 is inputted to the comparator 568 of the comparator circuit 551 without being corrected. Therefore, software correction cannot be applied to the comparator circuit 551, which is a safety circuit in which the relay 530 is used. For example, the comparator circuit 551 in which the thermistor T2 having a certain manufacturing variation is used may operate correctly when the actual temperature of the heater 230 is greater than or equal to the threshold temperature. However, the thermistor T2 having another manufacturing variation may cause the comparator circuit 551 to operate while the actual temperature is below the threshold temperature. Therefore, the thermistor T2 to which the software correction is applied is not connected to the safety circuit in which the relay 530 is used.

An advantage of software correction is that since it is a method of correction via the CPU 510, the manufacturing cost can be reduced. Hardware correction necessitates the cost of the variable resistor 562 itself, the cost of connecting the variable resistor 562, and the cost of adjusting the variable resistor 562 in the manufacturing process of the fixing apparatus 50. Therefore, hardware correction is applied to the thermistor T1 connected to the safety circuit in which the relay 530 is used. Accordingly, the fixing apparatus 50 is protected from an abnormal state caused by a malfunction of the CPU 510, a failure of the TRIAC 540, or the like.

By virtue of the present embodiment, the conductor 234 is formed on the front surface, which is different from the back surface on which the resistance heating elements 232 and 233 are mounted, between the back surface and the front surface of the substrate 235 of the heater 230. Furthermore, the conductor 234 and the frame ground 239 are connected via the capacitor 236. Compared to the comparative example in which the capacitor 236 is connected to the core metal 209, the present embodiment can reduce the cause of the potential variation that occurs in the film 202 when an excessive voltage occurs. This makes it possible to achieve both downsizing of the fixing apparatus 50 and protection of the fixing apparatus 50 from an excessive voltage.

By virtue of the present embodiment, the effect of manufacturing variation (individual variability) of the thermistor T1 and the thermistor T2 for detecting the temperature of the heater 230 is absorbed. As a result, the detection accuracy of the temperature is improved, and the safety of the heater 230 is improved.

Second Embodiment

Figure 6A:
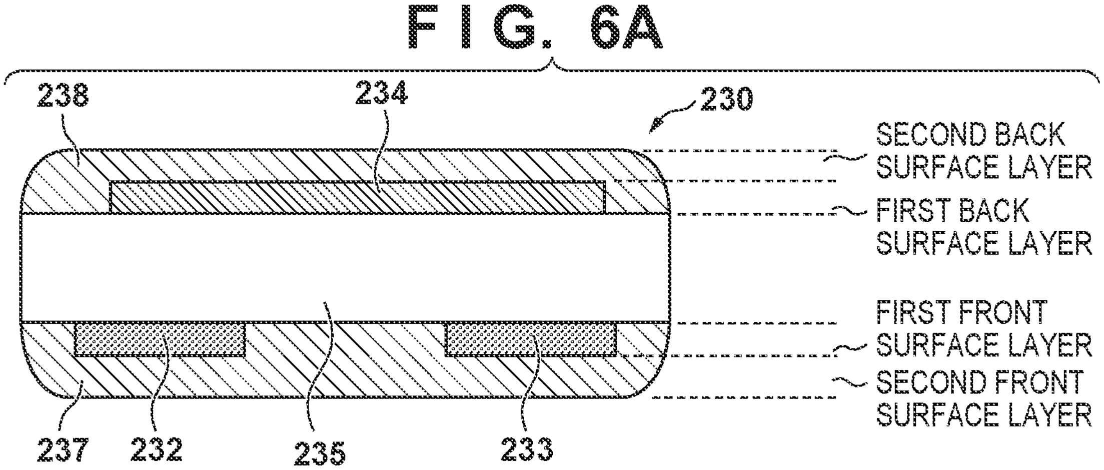
FIGS. 6A and 6B are diagrams for explaining a structure of a heater of a second embodiment.
Figure 6B:
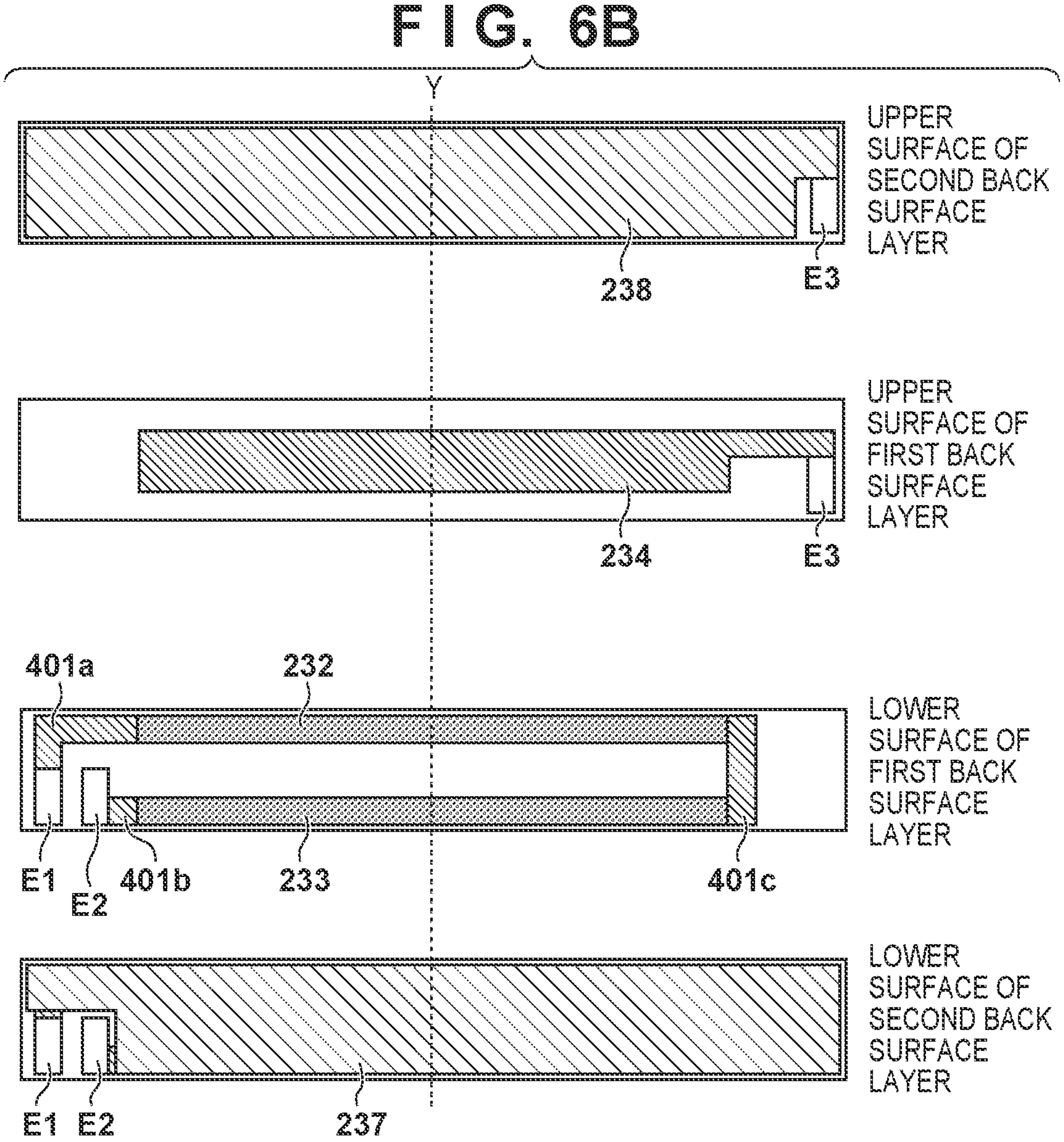

In the first embodiment, the resistance heating elements 232 and 233 are arranged on the back surface of the substrate 235 and the conductor 234 is arranged on the front surface of the substrate 235. However, as illustrated in FIGS. 6A and 6B, the resistance heating elements 232 and 233 may be arranged on the front surface (sliding surface) of the substrate 235, and the conductor 234 may be arranged on the back surface (non-sliding surface) of the substrate 235. The second embodiment is obtained by inverting the top and bottom of the heater 230 of the first embodiment. Therefore, the descriptions of the first embodiment are applied as is to other descriptions in the second embodiment.

Third Embodiment

In the first and second embodiments, the resistance heating elements 232 and 233 and the conductor 234 are arranged on different surfaces with respect to the substrate 235. However, the resistance heating elements 232 and 233 and the conductor 234 may each be arranged on the same side of the substrate 235.

A configuration of the image forming apparatus 100 of a third embodiment is the same as the configuration of the first embodiment except for the fixing apparatus 50. Therefore, in the following, only differences between the third embodiment and the first embodiment will be described in detail, and the descriptions of the first embodiment are to be referenced for descriptions of common points between the third embodiment and the first embodiment.

Figure 7:
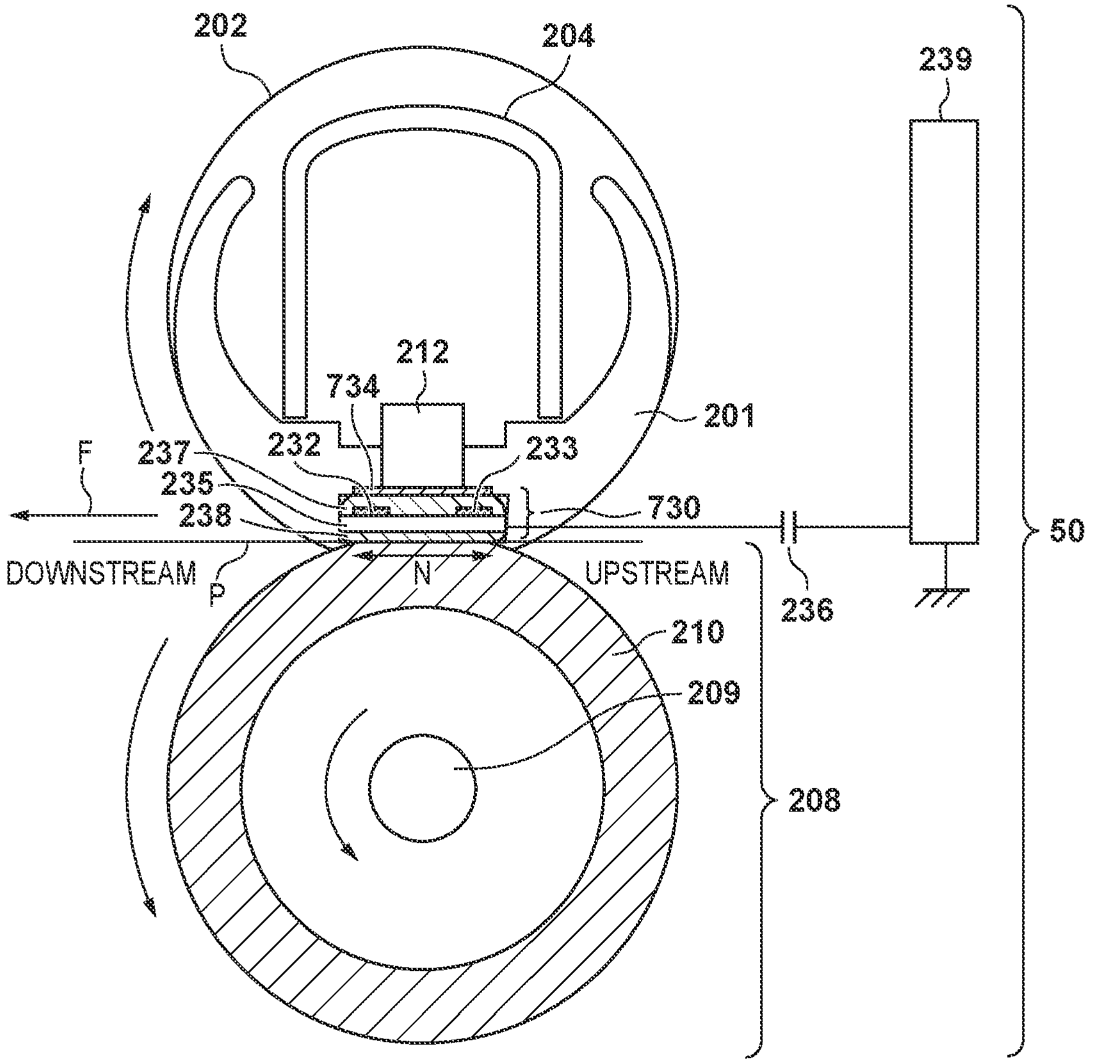
FIG. 7 is a diagram for explaining a configuration of a fixing apparatus of a third embodiment.
Figure 8A:
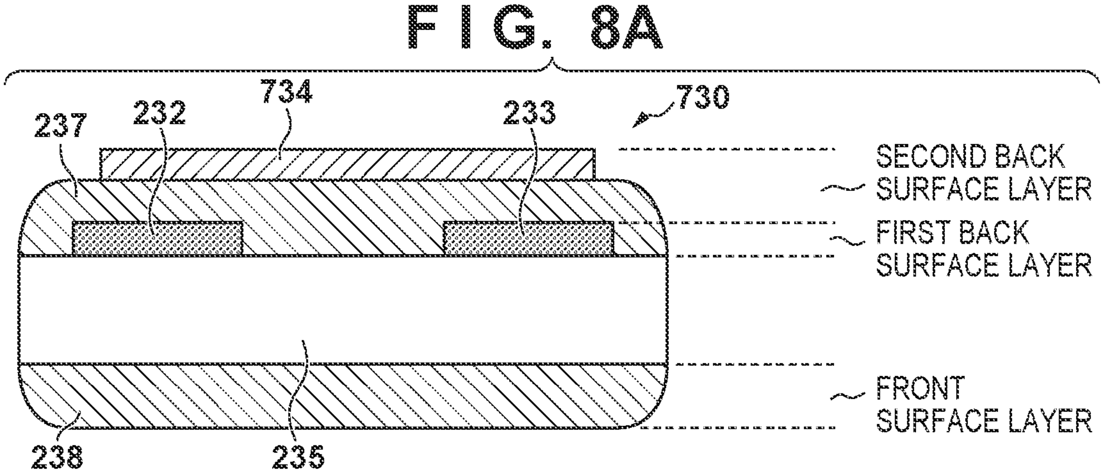
FIGS. 8A and 8B are diagrams for explaining a structure of a heater of the third embodiment.
Figure 8B:
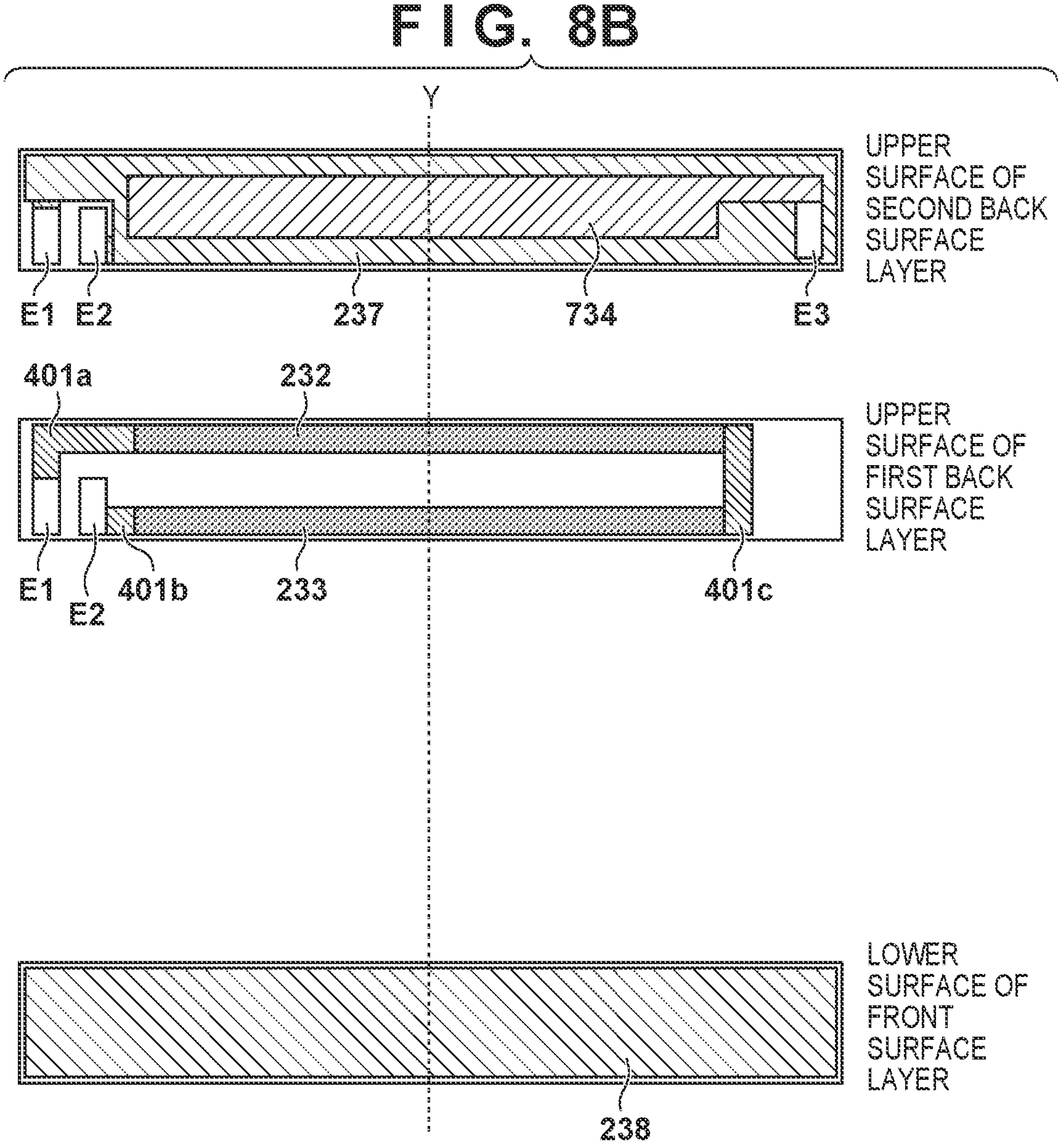

As illustrated in FIG. 7 and FIGS. 8A and 8B, a heater 730 is employed in place of the heater 230. A conductor 734 has a similar function (a polar plate of the capacitor) to that of the conductor 234. As illustrated in FIG. 8A, the conductor 734 and the resistance heating elements 232 and 233 are arranged on the same surface side of the substrate 235. The resistance heating elements 232 and 233 are mounted on the back surface of the substrate 235. Furthermore, the surface protective layer 237 is stacked so as to cover the resistance heating elements 232 and 233. Furthermore, the conductor 734 is stacked on the surface protective layer 237. Therefore, the conductive layer is not formed on the sliding surface side.

As illustrated in FIG. 8B, the conductor 734 is formed over the entire back surface side of the substrate 235, and the terminal E3 is formed on a longitudinal end portion of the substrate 235. The terminal E3 and one terminal of the capacitor 236 are electrically connected. The other terminal of the capacitor 236 is electrically connected to the frame ground 239. As illustrated in FIG. 8B, the surface protective layer 238 is formed on the sliding surface of the substrate 235.

In the present embodiment, the conductor 734 formed on the same side as the resistance heating elements 232 and 233 and the frame ground 239 are connected via the capacitor 236. However, an equivalent circuit of the third embodiment is similar to the equivalent circuit of the first embodiment illustrated in FIG. 3.

The conductor 734 is arranged in the vicinity of the resistance heating elements 232 and 233 and in the vicinity of the film 202. This increases the electrostatic capacitance Cfg between the film 202 and the conductor 734 and the electrostatic capacitance Chg between the resistance heating elements 232 and 233 and the conductor 734. As a result, the above-described effect of the variations is reduced. Since the thickness of the substrate 235 and the thicknesses of the surface protective layers 237 and 238 are unlikely to change, a variation in the electrostatic capacitance Cfg between the film 202 and the conductor 734 and a variation in the electrostatic capacitance Chg between the resistance heating elements 232 and 233 and the conductor 734 are reduced.

Therefore, the effect of variations in the potential is reduced, and it becomes possible to further shorten the creepage distance and the clearance distance that are maintained to prevent electric discharge from the film 202 to the frame ground 239 from occurring. This achieves both downsizing of the fixing apparatus 50 and protection of the fixing apparatus 50.

In the third embodiment, it is assumed that the capacitor 236 is arranged inside the fixing apparatus 50; however, this is only one example. The capacitor 236 may be arranged outside the fixing apparatus 50. In this case, the conductor 734 and the capacitor 236 are connected via a bundle of lines. This reduces the components in the fixing apparatus 50 and realizes further downsizing.

Figure 9:
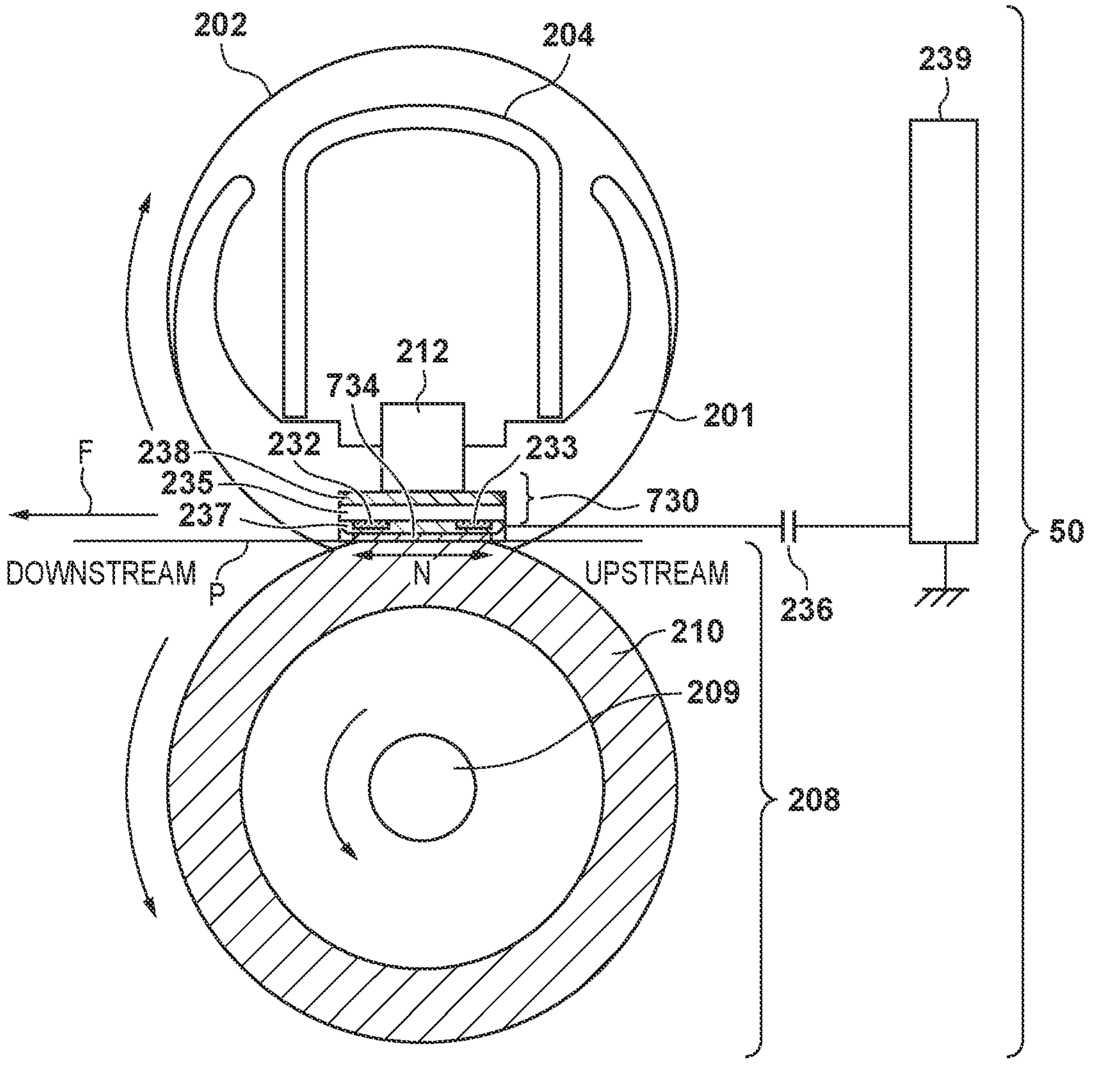
FIG. 9 is a diagram for explaining the structure of the heater of the third embodiment.

In the third embodiment, the resistance heating elements 232 and 233 and the conductor 734 are arranged on the back surface side of the substrate 235. However, the resistance heating elements 232 and 233 and the conductor 734 may be arranged on the sliding surface side of the substrate 235 as illustrated in FIG. 9. In this case, an additional surface protective layer may further be employed to cover the conductor 734. The sliding performance of the heater 730 may be improved by arranging an additional surface protective layer.

A potential variation of the fixing film when excessive voltage occurs is suppressed by forming the conductor 734 on the same side as the resistance heating elements 232 and 233 between the sides of the substrate 235 of the heater 730 and connecting the conductor 734 and the frame ground 239 by the capacitor 236. This makes it possible to achieve both downsizing of the fixing apparatus and protection of the fixing apparatus from an excessive voltage.

Fourth Embodiment

Generally, the technical concepts of a fourth embodiment are common to the technical concepts of the first embodiment. Therefore, in the following, only differences between the fourth embodiment and the first embodiment will be described in detail. The descriptions of the first embodiment to be referenced for the descriptions of common points between the fourth embodiment and the first embodiment.

Figure 10:
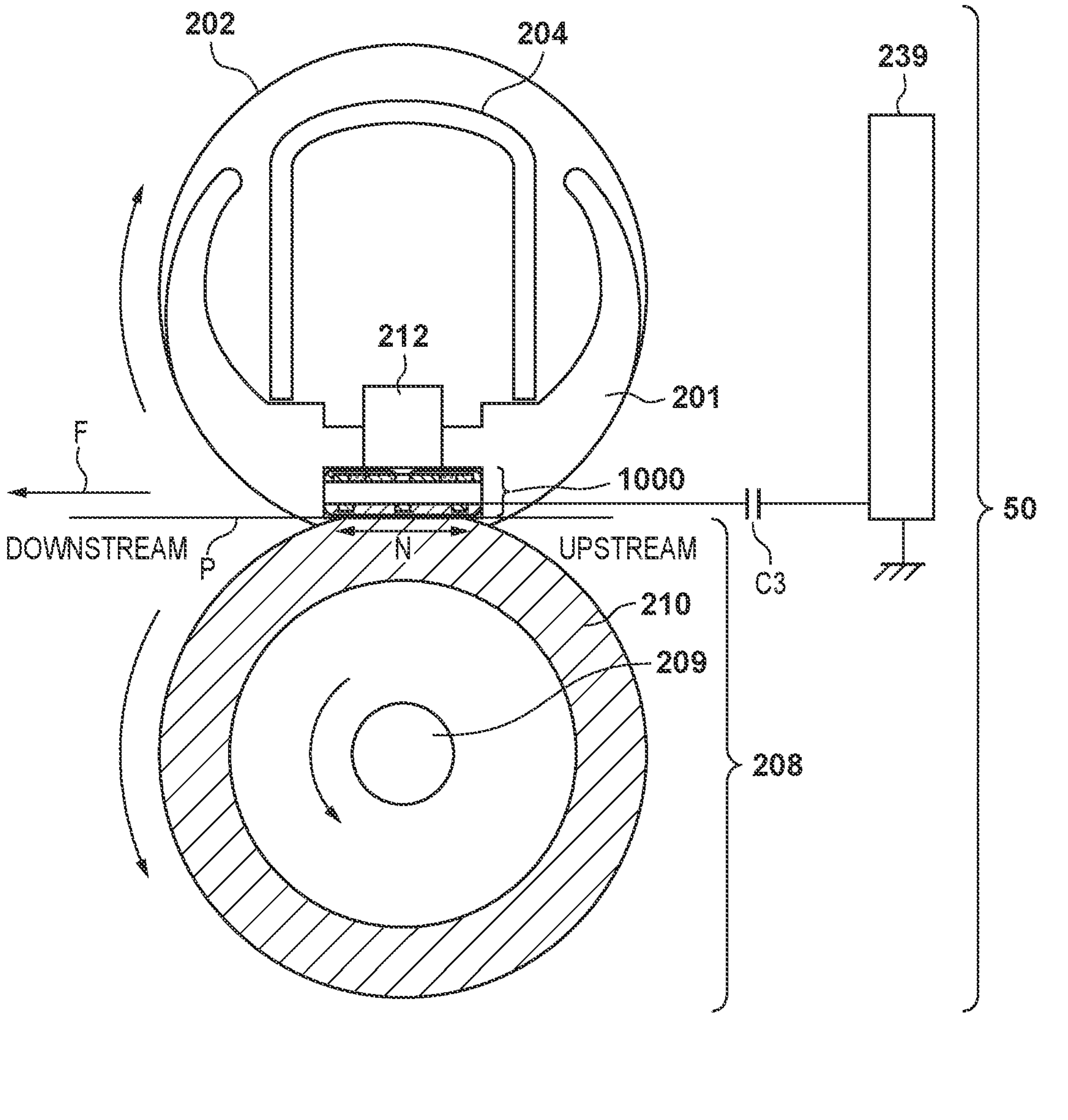
FIG. 10 is a diagram for explaining a fixing apparatus of a fourth embodiment.
Figure 11A:
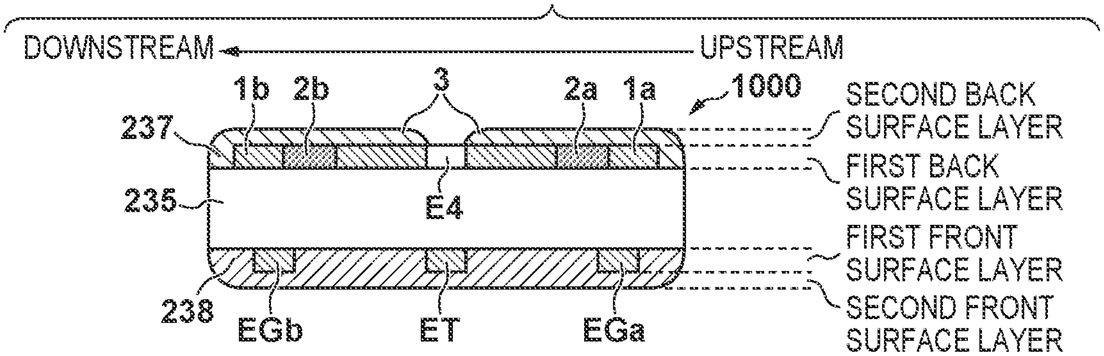
FIGS. 11A and 11B are diagrams for explaining a structure of a heater of the fourth embodiment.
Figure 11B:
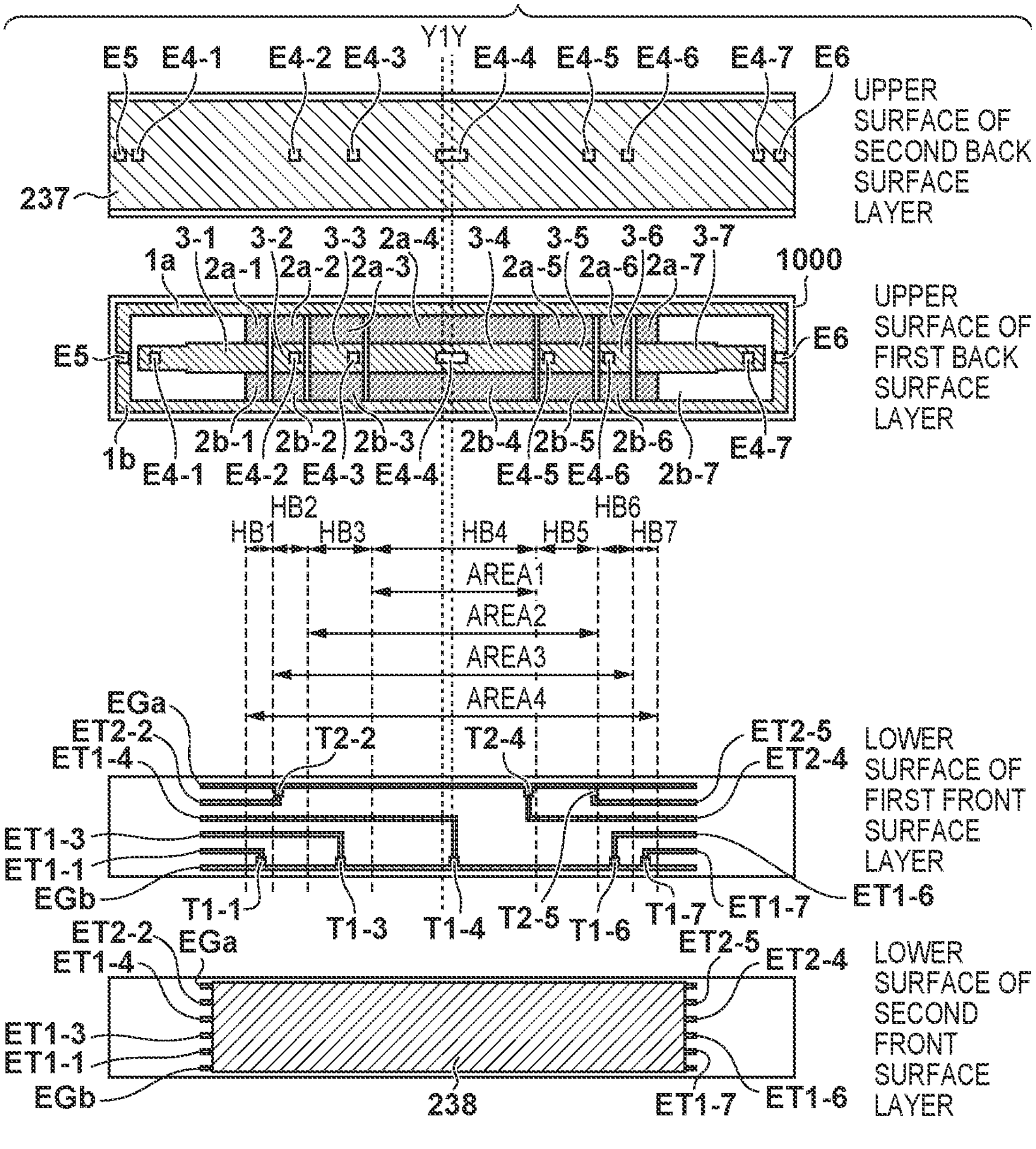

FIG. 10 illustrates the fixing apparatus 50 of the fourth embodiment. One point of difference is that a heater 1000 is employed in place of the heater 230. FIG. 11A is a cross-sectional view for when the heater 1000 is cut at a position Y1 in the vicinity of a conveyance reference position Y illustrated in FIG. 11B. FIG. 11B is a plan view for explaining a longitudinal structure of the heater 1000. A capacitor C3 is arranged between the frame ground 239 and the heater 1000.

As illustrated in FIG. 11A, a first back surface layer of the heater 1000 includes conductors 1*a* and 1*b* and a conductor 3 provided on the substrate 235. The conductor 1*a* is arranged on an upstream side of the conductor 1*b* in the conveyance direction of the sheet P. Furthermore, the first back surface layer includes resistance heating elements 2*a* and 2*b*. The resistance heating element 2*a* is provided between the conductor 1*a* and the conductor 3 on the substrate 235. The resistance heating element 2*b* is provided between the conductor 1*b* and the conductor 3 on the substrate 235. The conductors 1*a*, 1*b*, and 3 function as wiring for supplying power to the resistance heating elements 2*a* and 2*b*. The first back surface layer further includes an electrode E4 for supplying power. In this case, the electrode E4 is connected to the conductor 3.

The second back surface layer includes the insulating surface protective layer 237 which is formed of glass or the like. The surface protective layer 237 covers the back surface of the substrate 235; the conductors 1*a*, 1*b*, and 3; and the resistance heating elements 2*a* and 2*b*, excluding the electrode E4.

The first front surface layer of the heater 1000 is a layer contacting the front surface of the substrate 235. The first front surface layer includes a conductor ET for providing power to a plurality of thermistors T1 and T2 formed by printing and conductors EGa and EGb. The conductor EGa is arranged on an upstream side of the conductor EGb in the conveyance direction of the sheet P. A second front surface layer of the heater 1000 is stacked on the first front surface layer. The second front surface layer includes the surface protective layer 238 covering the conductor ET and the conductors EGa and EGb. The surface protective layer 238 is formed so as to be in each of the spaces between the conductor EGa, the conductor EGb, and the conductor ET, and at end portions thereof, in the first front surface layer.

As illustrated in FIG. 11B, in the first back surface layer of the heater 1000, the conductors 1*a*, 1*b*, and 3; the resistance heating elements 2*a* and 2*b*; and the electrode E4 form a heating block. In this example, there are seven heating blocks HB1 to HB7 in a longitudinal direction of the heater 1000. A heating block HBi is formed by the conductors 1*a*, 1*b*, and 3-*i*; resistance heating elements 2*a*-*i* and 2*b*-*i*; and an electrode E4-*i* (i is an index and is an integer from 1 to 7). Specifically, the resistance heating element 2*a*-*i* is provided between the conductor 1*a* and the conductor 3-*i* and is electrically connected to the conductor 1*a* and the conductor 3-*i*. The resistance heating element 2*b*-*i* is provided between the conductor 1*b* and the conductor 3-*i* and is electrically connected to the conductor 1*b* and the conductor 3-*i*. The conductor 3-*i* is electrically connected to the electrode E4-*i*. The conductors 1*a* and 1*b* are electrically connected to electrodes E5 and E6 at respective longitudinal ends of the substrate 235. Between the resistance heating element 2*a*-*i* and a resistance heating element 2*a*-*i*+1 is insulated. Between the resistance heating element 2*b*-*i* and a resistance heating element 2*b*-*i*+1 is insulated. Between the conductor 3-*i* and a conductor 3-*i*+1 is insulated. This makes it possible for the heating blocks HB1 to HB7 to selectively generate heat.

The surface protective layer 237 provided on the second back surface layer exposes electrodes E4-1 to E4-7, the electrode E5, and the electrode E6 and covers the conductors 1*a*, 1*b*, and 3-*i* and the resistance heating elements 2*a*-*i* and 2*b*-*i*. As illustrated in FIG. 11B, the heating blocks HB1 to HB7 form heating areas AREA1 to AREA4. For example, the heating area AREA1 is heated by the heating block HB4. The heating area AREA2 is heated by the heating blocks HB3, HB4, and HB5. The heating area AREA3 is heated by the heating blocks HB2 to HB6. The heating area AREA4 is heated by the heating blocks HB1 to HB7. The heating area AREA1 corresponds to an A5-sized sheet P. The heating area AREA2 corresponds to a B5-sized sheet P. The heating area AREA3 corresponds to an A4-sized sheet P. The heating area AREA4 corresponds to a Letter-sized sheet P.

Figure 12:
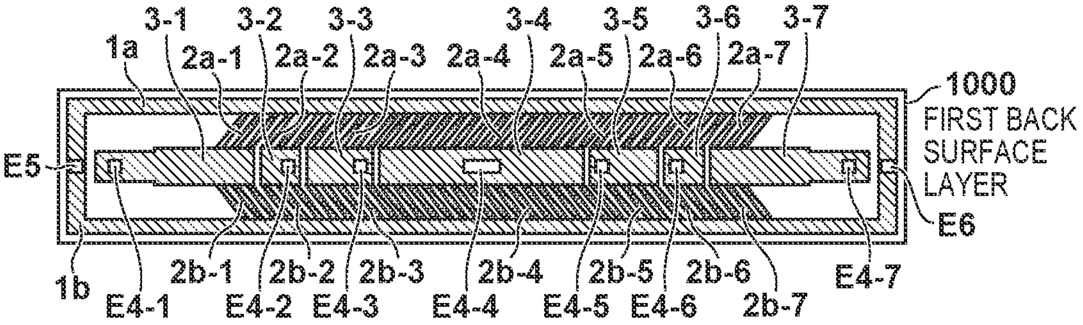
FIG. 12 is a diagram for explaining the structure of the heater of the fourth embodiment.

The CPU 510 is capable of controlling seven heating blocks HB1 to HB7. Therefore, the CPU 510 selects a heating block HBi to be supplied with power according to the size of the sheet P. The number of heating areas AREA and the number of heating blocks HB are only one example and may be greater or less than the numbers illustrated in FIG. 11B. The shapes and surface areas of the resistance heating element 2*a*-*i* and the resistance heating element 2*b*-*i* provided in the heating block HBi are also only one example. As illustrated in FIG. 12, the resistance heating element 2*a*-*i* and the resistance heating element 2*b*-*i* may be configured by a plurality of heating patterns (striped patterns), each separated by a space.

As illustrated in FIG. 11B, the first front surface layer (sliding surface layer) of the heater 1000 includes thermistors T1 and T2 for detecting the temperature of each heating block HBi. A thermistor T1-1 detects the temperature of the heating block HB1. A thermistor T2-2 detects the temperature of the heating block HB2. A thermistor T1-3 detects the temperature of the heating block HB3. A thermistor T1-4 and a thermistor T2-4 detect the temperature of the heating block HB4. A thermistor T2-5 detects the temperature of the heating block HB5. A thermistor T1-6 detects the temperature of the heating block HB6. A thermistor T1-7 detects the temperature of the heating block HB7. The thermistors T1 are T2 are formed by printing on the surface of the substrate 235. The thermistors T1-1, T1-3, T1-4, T1-6, and T1-7 are used to regulate the temperature of their respective corresponding heating blocks HB1, HB3, HB4, and HB7. Therefore, the thermistors T1-1, T1-3, T1-4, T1-6, and T1-7 are arranged at the center (the center in a longitudinal direction) of their respective corresponding heating blocks HB1, HB3, HB4, and HB7. Furthermore, the thermistors T1-1, T1-3, T1-4, T1-6, and T1-7 are arranged on the downstream side in the conveyance direction of the sheet P. This is because the temperature on the downstream side is higher than the temperature on the upstream side. This reduces unevenness in the distribution of temperature in the heating block HBi.

The thermistors T2-2, T2-4, and T2-5 are installed to detect the temperature of a non-sheet passing area. The non-sheet passing area is an area in the heating area in which heat is not absorbed by the sheet P. For example, when the sheet P whose width is narrow is conveyed, a heating area far from the conveyance reference position Y cannot supply heat to the sheet P. Therefore, when the size of the sheet P is narrower than the width of a selected heating area AREAi, the temperature of an area at an end portion of the selected heating area AREAi tends to increase. For such a reason, the thermistors T2-2, T2-4, and T2-5 are arranged on the upstream side in the conveyance direction of the sheet P and at a position away from the conveyance reference position Y (close to the outer side) in the corresponding heating blocks HB2, HB4, and HB5.

One end of each of the thermistors T1-1, T1-3, T1-4, T1-6, and T1-7 is connected to a respective one of conductors ET1-1, ET1-3, ET1-4, ET1-6, and ET1-7. The other end of each of the thermistors T1-1, T1-3, T1-4, T1-6, and T1-7 is commonly connected to the conductor EGb. One end of each of the thermistors T2-2, T2-4, and T2-5 is connected to a respective one of the conductors ET2-2, ET2-4, and ET2-5. The other end of each of the thermistors T2-2, T2-4, and T2-5 is commonly connected to the conductor EGa. Thus, when the number of thermistors T1 and T2 and the number of conductors ET1 and ET2 are increased, the lateral width of the heater 1000 is widened. Alternatively, when the number of thermistors T1 and T2 and the number of conductors ET1 and ET2 are increased, the spacing of the conductors ET1 and ET2 is narrowed.

The conductors ET1-1, ET1-3, ET1-4, and ET2-2 include an electrical contact at an end portion (left end in FIG. 11B) on the same side in the longitudinal direction of the substrate 235. The conductors ET1-6, ET1-7, ET2-4, and ET2-5 include an electrical contact at an end portion (right end in FIG. 11B) on a side that is opposite to that side.

The second front surface layer includes the surface protective layer 238 exposing the electrical contacts provided on the first front surface layer and covering substantially the entire sliding surface of the heater 1000. The material of the surface protective layer 238 is glass having an excellent sliding property, abrasion property, and sealing property.

Figure 13:
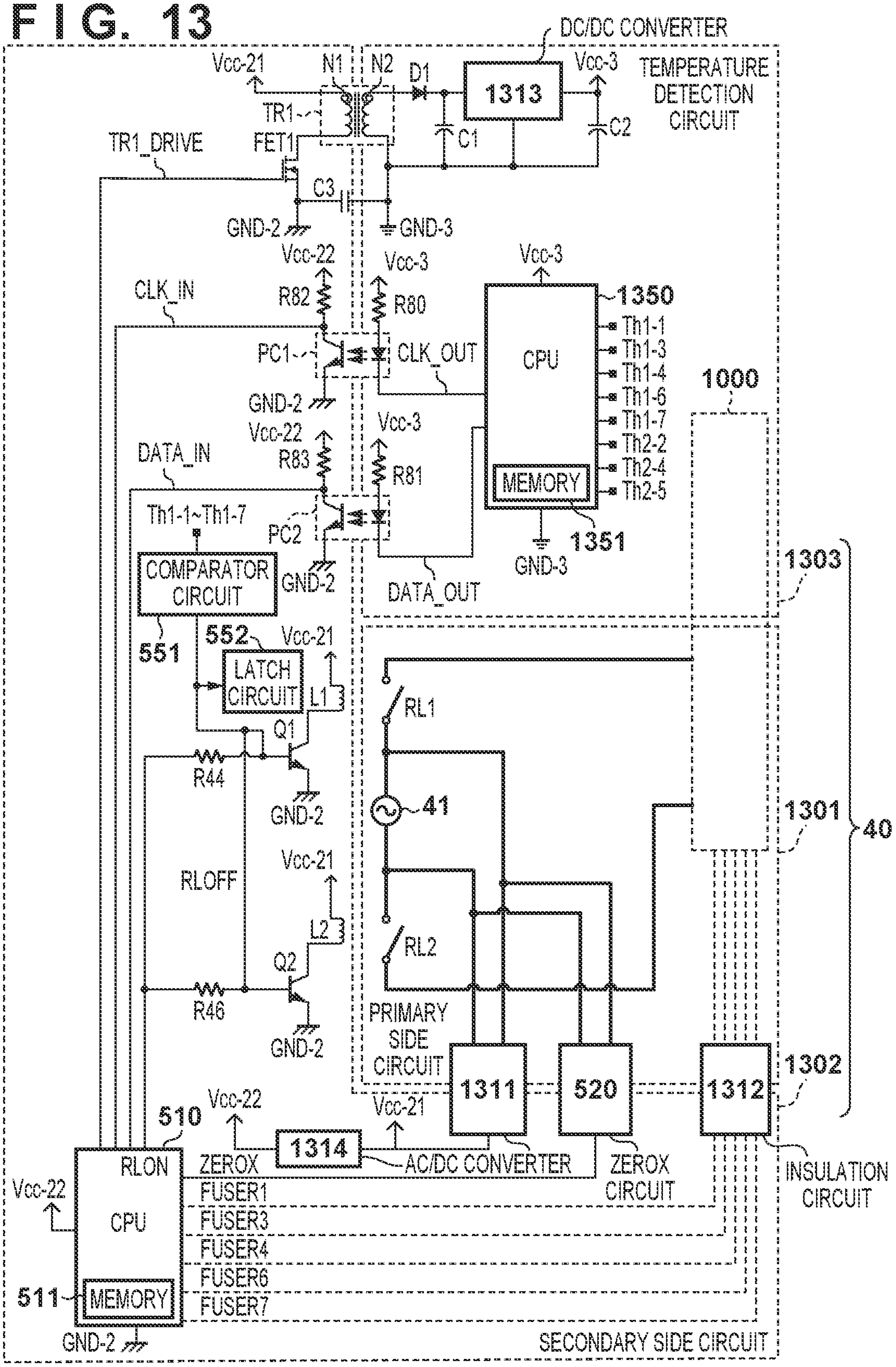
FIG. 13 is a diagram for explaining a power supply circuit (control circuit) of the third embodiment.
Figure 14:
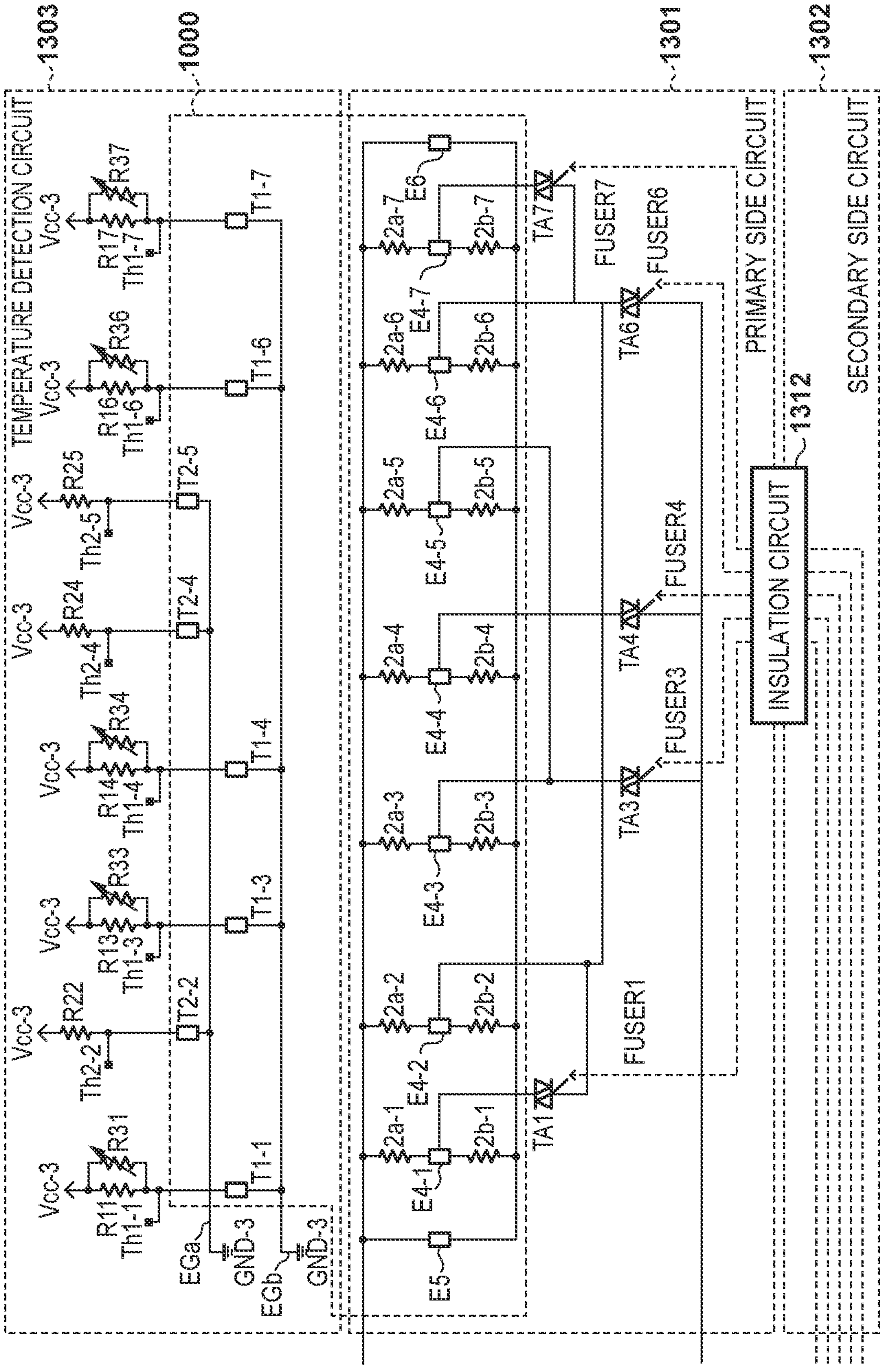
FIG. 14 is a diagram for explaining the power supply circuit (control circuit) of the third embodiment.

FIG. 13 illustrates a circuit diagram of the power supply circuit 40 for supplying power to the heater 1000 of the fourth embodiment. FIG. 14 illustrates the details of circuits in the vicinity of the heater 1000. Unlike the power supply circuit 40 according to the first embodiment, the power supply circuit 40 according to the fourth embodiment includes a primary side circuit 1301, a secondary side circuit 1302, and a temperature detection circuit 1303, which are electrically insulated from each other.

The primary side circuit 1301 is a circuit for supplying power supplied from the commercial alternating current power source 41 connected to the image forming apparatus 100 to the resistance heating element 2*a* and the resistance heating element 2*b* of the heater 1000. The resistance heating element 2*a* and the resistance heating element 2*b* are provided in the primary side circuit 1301, which is electrically connected to the commercial alternating current power source 41.

The commercial alternating current power source 41 is connected to the heater 1000 via a relay RL1; a relay RL2; and TRIACs TA1, TA3, TA4, TA6, and TA7.

The TRIAC TA1 performs on/off control of the resistance heating elements 2*a*-1 and 2*b*-1 in response to the control signal FUSER1 supplied from the CPU 510 via an insulation circuit 1312. The resistance heating elements 2*a*-1 and 2*b*-1 are connected to the TRIAC TA1 via the terminal E4-1. The TRIAC TA3 performs on/off control of the resistance heating elements 2*a*-3, 2*b*-3, 2*a*-5, and 2*b*-5 in response to a control signal FUSER3 supplied from the CPU 510 via the insulation circuit 1312. The resistance heating elements 2*a*-3 and 2*b*-3 are connected to the TRIAC TA3 via the terminal E4-3. The resistance heating elements 2*a*-5 and 2*b*-5 are connected to the TRIAC TA3 via the terminal E4-5. The TRIAC TA4 performs on/off control of the resistance heating elements 2*a*-4 and 2*b*-4 in response to a control signal FUSER4 supplied from the CPU 510 via the insulation circuit 1312. The resistance heating elements 2*a*-4 and 2*b*-4 are connected to the TRIAC TA4 via the terminal E4-4. The TRIAC TA6 performs on/off control of the resistance heating elements 2*a*-2, 2*b*-2, 2*a*-6, and 2*b*-6 in response to a control signal FUSER6 supplied from the CPU 510 via the insulation circuit 1312. The resistance heating elements 2*a*-2 and 2*b*-2 are connected to the TRIAC TA3 via the terminal E4-2. The resistance heating elements 2*a*-6 and 2*b*-6 are connected to the TRIAC TA6 via the terminal E4-6. The TRIAC TA7 performs on/off control of the resistance heating elements 2*a*-7 and 2*b*-7 in response to a control signal FUSER7 supplied from the CPU 510 via the insulation circuit 1312. The resistance heating elements 2*a*-7 and 2*b*-7 are connected to the TRIAC TA7 via the terminal E4-7. The TRIACs TA1 and TA7 are connected to the commercial alternating current power source 41 via the TRIAC TA6. The insulation circuit 1312 is a circuit for electrically insulating the primary side circuit 1301 and the secondary side circuit 1302.

The TRIAC TA4 controls the heating block HB4. The TRIAC TA3 controls the heating block HB3 and the heating block HB5. Here, one TRIAC TA3 is electrically connected to two heating blocks HB3 and HB5. The TRIAC TA6 controls the heating block HB2 and the heating block HB6. Here, one TRIAC TA6 is electrically connected to two heating blocks HB2 and HB6. Here, the TRIAC TA1 for driving the heating block HB1 is connected in series with the TRIAC TA6 for driving the adjacent heating block HB2. Here, the TRIAC TA7 for driving the heating block HB7 is connected in series with the TRIAC TA6 for driving the adjacent heating block HB6.

When only the TRIAC TA6 is driven, the heating block HB2 and the heating block HB6 generate heat. When both the TRIAC TA1 and the TRIAC TA6 are driven, the heating blocks HB1, HB2, and HB6 generate heat. When both the TRIAC TA6 and the TRIAC TA7 are driven, the heating blocks HB2, HB6, and HB7 generate heat. Furthermore, when the TRIAC TA1, the TRIAC TA6, and the TRIAC TA7 are driven, the heating blocks HB1, HB2, HB6, and HB7 generate heat. Therefore, in the example illustrated in FIG. 14, there is not an instance in which only the heating blocks HB1 and HB7 generate heat. Further, in this circuit configuration, the control for heating the heating blocks HB2 and HB6 and the control for heating the heating blocks HB1 and HB7 in addition to the heating blocks HB2 and HB6 are selectable. Therefore, the CPU 510 can select the heating block HBi according to the size of the sheet P.

As illustrated in FIG. 13, an insulated-type AC/DC converter 1311 is a switching power supply circuit for supplying power from the primary side circuit 1301 to the secondary side circuit 1302. The AC/DC converter 1311 generates a power source voltage Vcc-21 for the secondary side circuit 1302. The AC/DC converter 1311 incorporates a transformer for maintaining reinforced insulation of the primary side circuit 1301 and the secondary side circuit 1302.

The temperature detection circuit 1303 includes the thermistors T1 and T2 and a CPU 1350 and the like for detecting the temperature of the heater 1000. As illustrated in FIG. 14, the conductor EGa and the conductor EGb are connected to a ground potential GND-3. A pull-up resistor R11 is connected between the thermistor T1-1 and a power source voltage Vcc-3. A variable resistor R31 is connected in parallel to the pull-up resistor R11. A detected voltage Th1-1 of the thermistor T1-1 is generated by dividing the power source voltage Vcc-3 by the resistance of the pull-up resistor R11, the variable resistor R31, and the thermistor T1-1. A pull-up resistor R13 is connected between the thermistor T1-3 and the power source voltage Vcc-3. A variable resistor R33 is connected in parallel to the pull-up resistor R13. A detected voltage Th1-3 of the thermistor T1-3 is generated by dividing the power source voltage Vcc-3 by the resistance of the pull-up resistor R13, the variable resistor R33, and the thermistor T1-3. A pull-up resistor R14 is connected between the thermistor T1-4 and the power source voltage Vcc-3. A variable resistor R34 is connected in parallel to the pull-up resistor R14. A detected voltage Th1-4 of the thermistor T1-4 is generated by dividing the power source voltage Vcc-3 by the resistance of the pull-up resistor R14, the variable resistor R34, and the thermistor T1-4. A pull-up resistor R16 is connected between the thermistor T1-6 and the power source voltage Vcc-3. A variable resistor R36 is connected in parallel to the pull-up resistor R16. A detected voltage Th1-6 of the thermistor T1-6 is generated by dividing the power source voltage Vcc-3 by the resistance of the pull-up resistor R16, the variable resistor R36, and the thermistor T1-6. A pull-up resistor R17 is connected between the thermistor T1-7 and the power source voltage Vcc-3. A variable resistor R37 is connected in parallel to the pull-up resistor R17. A detected voltage Th1-7 of the thermistor T1-7 is generated by dividing the power source voltage Vcc-3 by the resistance of the pull-up resistor R17, the variable resistor R37, and the thermistor T1-7.

A pull-up resistor R22 is connected between the thermistor T2-2 and the power source voltage Vcc-3. A detected voltage Th2-2 of the thermistor T2-2 is generated by dividing the power source voltage Vcc-3 by the resistance of the pull-up resistor R22 and the thermistor T2-2. A pull-up resistor R24 is connected between the thermistor T2-4 and the power source voltage Vcc-3. A detected voltage Th2-4 of the thermistor T2-4 is generated by dividing the power source voltage Vcc-3 by the resistance of the pull-up resistor R24 and the thermistor T2-4. A pull-up resistor R25 is connected between the thermistor T2-5 and the power source voltage Vcc-3. A detected voltage Th2-5 of the thermistor T2-5 is generated by dividing the power source voltage Vcc-3 by the resistance of the pull-up resistor R25 and the thermistor T2-5.

The detected voltages Th1-1, Th-3, Th1-4, Th1-6, and Th1-7 and the detected voltages Th2-2, Th2-4, and Th2-5 are each inputted to an A/D port of the CPU 1350. The CPU 1350 converts each detected voltage into a temperature according to a conversion table stored in a memory 1351. The CPU 1350 provides a CLK_OUT signal and a DATA_OUT signal so as to transmit temperature information to the CPU 510. The CPU 510 obtains the temperature information detected by the temperature detection circuit 1303 by receiving a CLK_IN signal corresponding to the CLK_OUT signal and a DATA_IN signal corresponding to the DATA_OUT signal.

Between the CLK_OUT signal and the CLK_IN signal is insulated by a photocoupler PC1. A resistor R80 limits the current flowing through a light emitting diode of the photocoupler PC1. A resistor R82 limits the current flowing through a phototransistor of the photocoupler PC1. Between the DATA_OUT signal and the DATA_IN signal is insulated by a photocoupler PC2. A resistor R81 limits the current flowing through a light emitting diode of the photocoupler PC2. A resistor R83 limits the current flowing through the phototransistor of the photocoupler PC2.

The CPU 510 calculates the power to be supplied by executing PI control based on the detected temperature of the thermistor T1-3 provided in the heating block HB3. The thermistor T2-5 provided in the heating block HB5 serves a supplementary role. For example, when the detected temperature is equal to or higher than a preset temperature, the CPU 510 reduces the conveyance speed of the sheet P (rotational speed of the motor 30). This suppresses an excessive rise in the temperature of the non-sheet passing area. The heating blocks HB2 and HB6 are similarly controlled. The CPU 510 controls the power to be supplied to the heating block HB6 based on the detected temperature of the thermistor T1-6 provided in the heating block HB6. The thermistor T2-2 provided in the heating block HB2 serves a supplementary role. The heating blocks HB3 and HB5 are arranged to be symmetrical across the conveyance reference position Y of the sheet P. The heating blocks HB2 and HB6 are also arranged to be symmetrical across the conveyance reference position Y of the sheet P. Here, the temperature distribution of the heating block HB3 and the temperature distribution of the heating block HB5 are approximately the same. The temperature distribution of the heating block HB2 and the temperature distribution of the heating block HB6 are approximately the same. Therefore, the thermistor T is arranged only in one of a pair of heating blocks. Therefore, as compared with a case where the heating blocks HB are individually controlled, the number of TRIACs TA and the number of driving circuits thereof, the number of thermistors T and the number of detection circuits thereof, and the number of connectors and electrical wires for wiring these can be reduced. As a result, cost reduction and downsizing of the fixing apparatus 50 can be achieved.

The heating block HB4 is controlled by the TRIAC TA4. The heating block HB4 is arranged at the center of the heater 1000 and does not have a pairing heating block HB. The surface area of the heating block HB4 is relatively large. Therefore, in the present embodiment, two thermistors T1-4 and T2-4 are arranged. The thermistor T1-4 is a temperature sensor for temperature control. The thermistor T2-4 is a temperature sensor serving a supplementary role.

The heating areas of the heating blocks HB1 and HB7 are relatively narrow. Therefore, the thermistors T1-1 and T1-7 operate as temperature sensors for detecting the temperature of the non-sheet passing areas (end portions) and also operate as a temperature sensor for temperature control.

As illustrated in FIG. 11B, an electrode of each of the conductors ET1-1, ET1-3, ET1-4, and ET2-2; the conductor EGa; and the conductor EGb connected to the thermistors T is provided at one end portion on the sliding surface side of the heater 1000. An electrode of each of the conductors ET1-6, ET1-7, ET2-4, and ET2-5 connected to the thermistors T is provided on the other end portion on the sliding surface side of the heater 1000. An electrode of the conductor ET1-*i* (i is any of 1, 4, 6, and 7) is connected to one end of a resistor R1*i* and one end of a variable resistor R3*i* on a substrate including the power supply circuit 40 mounted on the image forming apparatus 100 or the fixing apparatus 50. An electrode of the conductor ET2-*j* (j is any of 2, 4, and 5) is connected to one end of a resistor R2*j* on the substrate including the power supply circuit 40.

A flexible flat printed circuit (FPC) or the like may be employed as an interface for connection. FPC has a plurality of conductor foil patterns in an inner layer of a film-like insulator. One end portion of a conductor of the FPC and an electrode of each of the conductors ET1-1, ET1-3, ET1-4, ET1-6, and ET1-7; the conductors ET2-2, ET2-4, and ET2-5; and the conductor EGa; and the conductor EGb on the heater 1000 can be connected by soldering. The other end portion of the conductor of the FPC and the substrate including the power supply circuit 40 can be connected by a connector or the like. In order to use a connector for a general purpose flexible flat cable (FFC) as the connector, a pitch between the respective conductors may be a 0.5-mm pitch or a 1.0-mm pitch.

The temperature detection circuit 1303 includes a DC/DC converter 1313 for generating the power source voltage Vcc-3. The power source voltage Vcc-3 is supplied to the CPU 1350 and the like. A transformer TR1 is a switching transformer for generating the power source voltage Vcc-3. The transformer TR1 includes a primary winding N1 and a secondary winding N2, and a reinforced insulation is applied between the primary winding N1 and the secondary winding N2. A field-effect transistor FET1 switches the power source voltage Vcc-21 supplied to the primary winding N1 according to a TR1_DRIVE signal inputted from the CPU 510. Thus, the energy stored in the primary winding N1 of the transformer TR1 is transmitted to the secondary winding N2. A pulsating current generated in the secondary winding N2 becomes a direct current by being rectified by a diode D1 and smoothed by a capacitor C1. The DC/DC converter 1313 and a capacitor C2 reduce a DC voltage generated by the capacitor C1 to the predetermined power source voltage Vcc-3. The capacitor C3 is a capacitor connected between the secondary side circuit 1302 and the temperature detection circuit 1303. The effect of the capacitor C3 will be described later.

A load current of the temperature detection circuit 1303 causes a voltage on each end of the capacitor C1 to vary. Therefore, by employing the DC/DC converter 1313, the power source voltage Vcc-3 is stabilized. The power source voltage Vcc-3 is, for example, 3.3 V. A linear regulator, such as a low drop-out (LDO), may be employed in place of the DC/DC converter 1313.

For example, a duty cycle of the TR1_DRIVE signal is set to 50% and a switching frequency is set from 80 kHz to 120 kHz. That is, the CPU 510 changes a frequency of the TR1_DRIVE signal. This distributes the switching frequency and reduces EMC noise. EMC is an abbreviation for electromagnetic compatibility.

Figure 15:
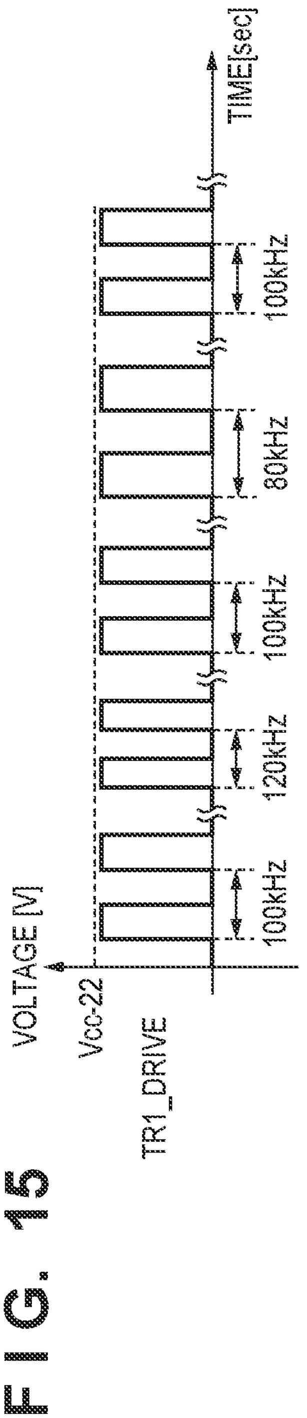
FIG. 15 is a diagram for explaining a driving signal of the fourth embodiment.

FIG. 15 illustrates an example of a waveform of the TR1_DRIVE signal. A vertical axis indicates voltage. A horizontal axis indicates time. The switching frequency gradually increases from 100 kHz to 120 kHz. Thereafter, the switching frequency gradually decreases from 120 kHz to 80 kHz. Thereafter, the switching frequency gradually increases from 80 kHz to 100 kHz. These are repeated. A high level of the TR1_DRIVE signal is 3.2 V. A low level is 0.1 V. A method of changing the switching frequency illustrated in FIG. 15 is only one example. Regarding the method of changing the switching frequency, the switching frequency may be changed as appropriate according to the characteristics of the power source voltage Vcc-3 and EMC noise.

A basic insulation or reinforced insulation is applied between the primary side circuit 1301 and the temperature detection circuit 1303. The temperature detection circuit 1303 is a circuit that the user cannot touch. An additional insulation or reinforced insulation may be applied between the temperature detection circuit 1303 and the secondary side circuit 1302. Thus, the secondary side circuit 1302 is a circuit including electrical components and wiring that the user can touch. Meanwhile, the temperature detection circuit 1303 does not include electrical components and wiring that the user can touch. The effect of insulating the temperature detection circuit 1303 from both the primary side circuit 1301 and the secondary side circuit 1302 will be described later.

As illustrated in FIG. 13, the secondary side circuit 1302 includes a DC/DC converter 1314. The DC/DC converter 1314 is a voltage drop circuit for generating a power source voltage Vcc-22 (e.g., 3.3 V) by reducing the power source voltage Vcc-21 (e.g., 5 V). An input terminal and an output terminal of the DC/DC converter 1314 are connected to a ground potential GND-2 via a capacitor (not illustrated). The ground potential GND-2 is a ground potential provided by the frame ground 239.

The CPU 510 calculates the power to be supplied by PI control or the like based on a set temperature and detected temperatures of the thermistor T1-1, T1-3, T1-4, T1-6, and T1-7 inputted by the CLK_IN signal and the DATA_IN signal. The CPU 510 recognizes the zero cross timing of the commercial alternating current power source 41 by the zero cross circuit 520. The CPU 510 converts the power to be supplied into control conditions (a control level of a phase angle (phase control) and a wavenumber (wavenumber control)). The CPU 510 controls the TRIACs TA1, TA3, TA4, TA6, and TA7 according to the control conditions.

As illustrated in FIG. 13, two relays RL1 and RL2 are provided. The CPU 510 is connected to a base terminal of a transistor Q1 via a resistor R44. A collector of the transistor Q1 is connected to the power source voltage Vcc-21 via a secondary side coil L1 of the relay RL1. An emitter of the transistor Q1 is connected to the ground potential GND-2. The CPU 510 is connected to a base terminal of a transistor Q2 via a resistor R46. A collector of the transistor Q2 is connected to the power source voltage Vcc-21 via a secondary side coil L2 of the relay RL2. An emitter of the transistor Q2 is connected to the ground potential GND-2.

When the CPU 510 causes the RLON signal to enter a high state, the RLON signal causes the transistor Q1 to turn on via the resistor R44. A current flows from the power source voltage Vcc-21 to the secondary side coil L1 of the relay RL1 and a primary side contact of the relay RL1 enters an on state. When the CPU 510 causes the RLON signal to enter a low state, the transistor Q1 enters an off state and the current flowing from the power source voltage Vcc-21 to the secondary side coil L1 of the relay RL1 is cut off. This causes the primary side contact of the relay RL1 to enter an off state. The operation is similar for the relay RL2. When the CPU 510 causes the RLON signal to enter a high state, the RLON signal causes the transistor Q2 to turn on via the resistor R46. A current flows from the power source voltage Vcc-21 to the secondary side coil L2 of the relay RL2 and a primary side contact of the relay RL2 enters an on state. When the CPU 510 causes the RLON signal to enter a low state, the transistor Q2 enters an off state. The current flowing from the power source voltage Vcc-21 to the secondary side coil L2 of the relay RL2 is cut off. As a result, the primary side contact of the relay RL2 enters an off state.

A safety circuit in which the relay RL1 and the relay RL2 are used operates as follows. When a detected temperature of any of the thermistors T1-1, T1-3, T1-4, T1-6, and T1-7 exceeds a threshold set in the comparator circuit 551, the comparator circuit 551 operates the latch circuit 552. The latch circuit 552 latches the RLOFF signal to a low state. When the RLOFF signal is latched to a low state, the transistor Q1 and the transistor Q2 are maintained in an off state even if the CPU 510 sets the RLON signal to a high state. Therefore, the relay RL1 and the relay RL2 are maintained in an off state (safe condition). Thus, when the heater 1000 is excessively heated, the relay RL1 and the relay RL2 can cut off the power supplied to the heater 1000. The operation of the comparator circuit 551 and the operation of the latch circuit 552 are similar to the operations described in the first embodiment, and so descriptions thereof will be omitted. When at least one of the thermistors T1-1, T1-3, T1-4, T1-6, and T1-7 detects an anomaly, the RLOFF signal is maintained in a low state and the relay RL1 and the relay RL2 are in an off state. As a result, the power supply to the heater 1000 is cut off.

Figure 16:
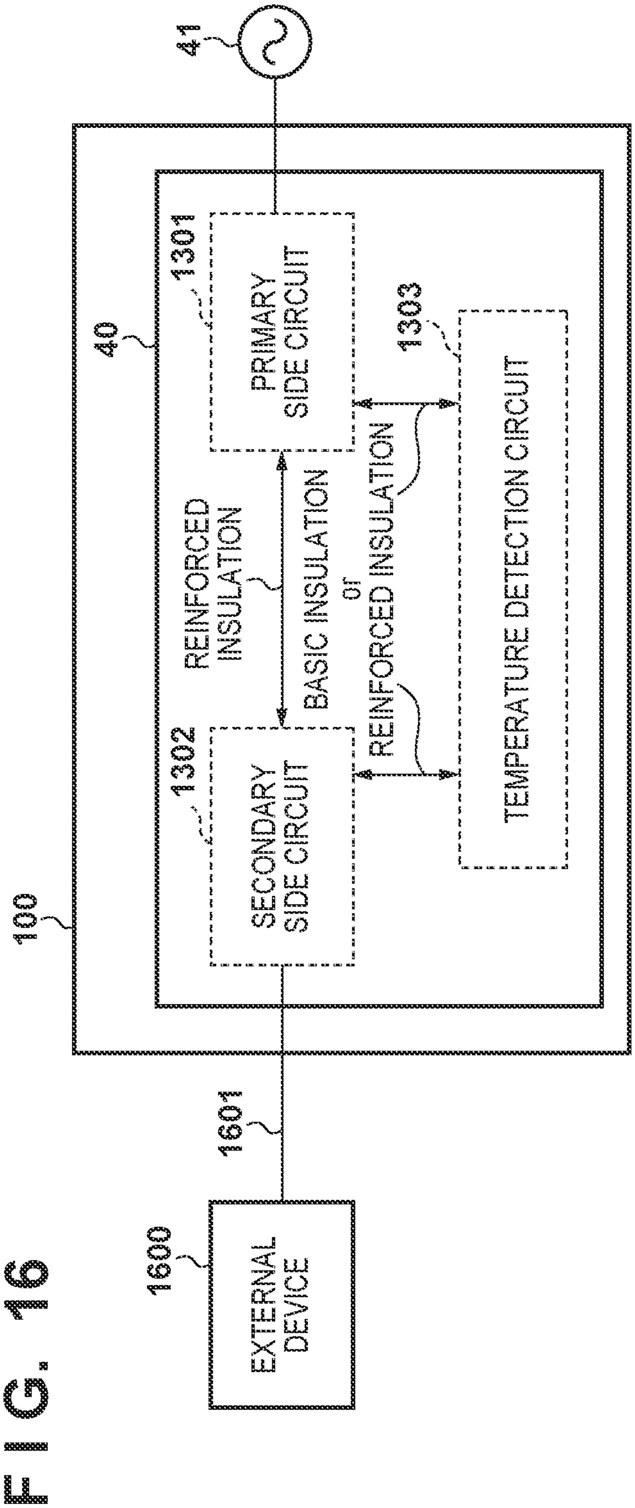
FIG. 16 is a diagram for explaining insulation of the fourth embodiment.

Incidentally, the user or the like may remove a jammed sheet P. In this case, the user opens a door (maintenance door) of the image forming apparatus 100. The image forming apparatus 100 may include electrical components, wiring, and the like that the user can touch while the door is open. As illustrated in FIG. 16, an interface cable 1601 connecting an external apparatus 1600, such as a PC, and the image forming apparatus 100 is also an electric component that the user can touch. The interface cable 1601 may be, for example, a cable complying with Universal Serial Bus (USB) or a local area network (LAN). As illustrated in FIG. 16, an electrical component (the interface cable 1601) provided in a location where the user can touch it is connected to the secondary side circuit 1302. A reinforced insulation is applied between the primary side circuit 1301 to which the commercial alternating current power source 41 is connected and the secondary side circuit 1302. This circuit configuration enhances the safety of the user with respect to electrical components and wiring, which are provided in a location where the user can touch them.

Figure 17:
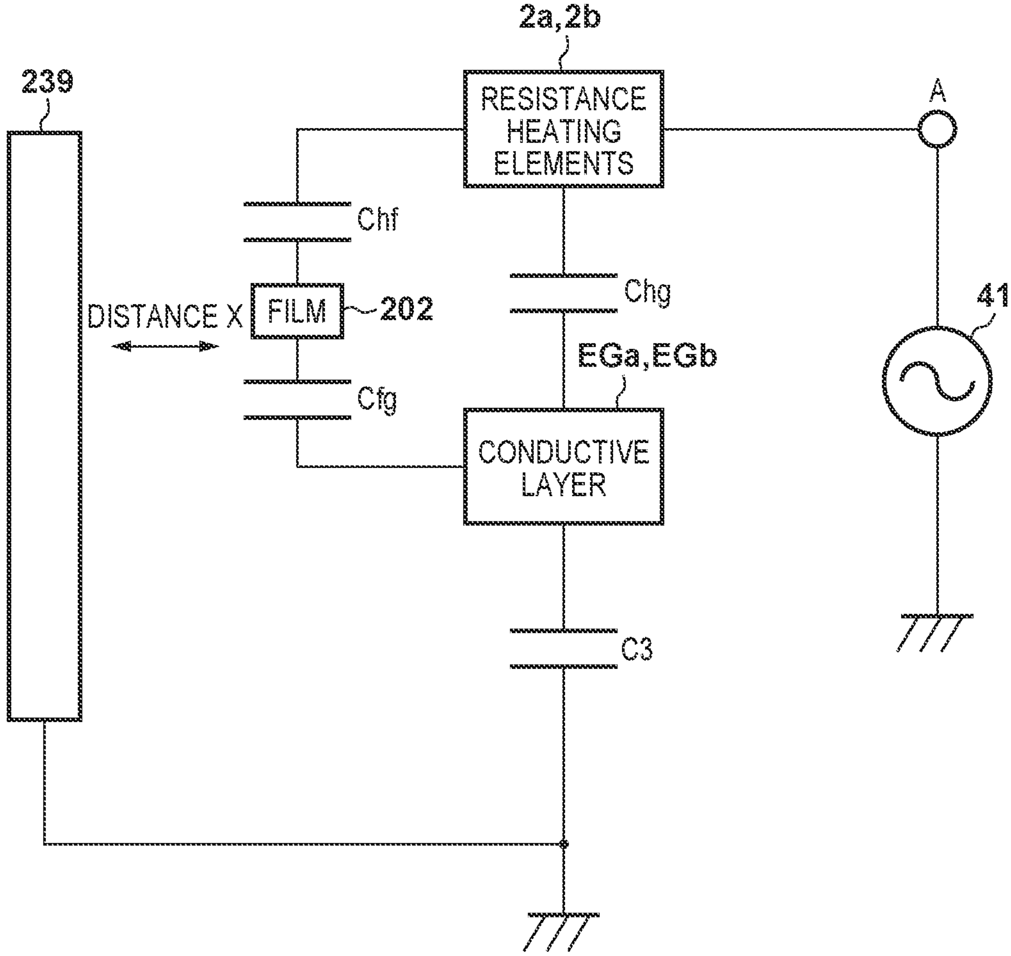
FIG. 17 is a diagram for explaining an equivalent circuit of the fixing apparatus of the fourth embodiment.

FIG. 17 illustrates an electrical equivalent circuit of the fixing apparatus 50 according to the fourth embodiment. The fourth embodiment is different from the first embodiment in that the resistance heating elements 232 and 233 are the resistance heating elements 2*a* and 2*b*, in that the conductor 234 is the conductor EGa and the conductor EGb, and in that the capacitor 236 (capacitance=Cx) is the capacitor C3.

In a conventional fixing apparatus, a core metal of a pressing roller and a frame ground are connected via a capacitor. Therefore, a distance between a fixing nip portion and the core metal of the pressing roller is increased, and the electrostatic capacitance of the pressing roller is smaller. The electrostatic capacitance of the pressing roller may vary greatly depending on the thickness variation or the like of the pressing roller. As a result, when an excessive voltage occurs, a potential of the fixing film varies. Considering this variation, it is necessary to increase the creepage distance and the clearance distance of the fixing apparatus, preventing downsizing of the fixing apparatus.

As illustrated in FIG. 17, in the fourth embodiment, the conductor EGa and the conductor EGb provided on the sliding surface of the substrate 235 and the frame ground 239 are connected via the capacitor C3. In addition, the temperature detection circuit 1303 is insulated from both the primary side circuit 1301 and the secondary side circuit 1302. Accordingly, the electrostatic capacitance Chf is generated between the resistance heating elements 2*a* and 2*b* and the film 202. The electrostatic capacitance Cfg is generated between the film 202 and the temperature detection circuit 1303. The electrostatic capacitance Chg is generated between the resistance heating elements 2*a* and 2*b* and the temperature detection circuit 1303. The capacitor C3 is connected between the temperature detection circuit 1303 and the frame ground 239. The electrostatic capacitance of the capacitor C3 is also expressed as C3.

The equivalent circuit of the fixing apparatus 50 of the fourth embodiment corresponds to the equivalent circuit of the fixing apparatus 50 of the first embodiment in which the conductor 234 has been replaced with the temperature detection circuit 1303 and the resistance heating elements 232 and 233 have been replaced with the resistance heating elements 2*a* and 2*b*. Therefore, in the fourth embodiment, the electrostatic capacitance Cfg and the electrostatic capacitance Chg are increased by the temperature detection circuit 1303 being arranged near the resistance heating elements 2*a* and 2*b* and the film 202, thereby the effect of the variation in the potential of the film 202 becoming reduced. In addition, the thickness of the substrate 235 and the thickness of the surface protective layer 238 tend not to change. Therefore, the variation in the electrostatic capacitance Cfg and the variation of the electrostatic capacitance Chg are reduced.

Thus, the effect of the variation in the potential of the film 202 is reduced, making it possible to shorten the creepage distance and the clearance distance which are for preventing discharge from the film 202 to the frame ground 239. As a result, it becomes possible to achieve both downsizing of the fixing apparatus 50 and protection of the fixing apparatus 50.

The temperature detection circuit 1303, which is insulated from the primary side circuit 1301 and the secondary side circuit 1302 of the fourth embodiment, is employed as the conductor 234 of the first embodiment. Thus, the creepage distance and the clearance distance for reducing discharge from the film 202 to the frame ground 239 are shortened without the conductor 234 being added. As a result, it becomes possible to achieve both downsizing of the fixing apparatus 50 and protection of the fixing apparatus 50.

In the fourth embodiment, it is assumed that the capacitor C3 is arranged in a circuit provided outside the fixing apparatus 50; however, this is only one example. The capacitor C3 may be arranged inside the fixing apparatus 50.

In the fourth embodiment, the resistance heating elements 2*a* and 2*b* are arranged on the back surface side of the substrate 235, and the conductors EGa and EGb are arranged on the sliding surface side of the substrate 235; however, this is only one example. The resistance heating elements 2*a* and 2*b* are arranged on the sliding surface side of the substrate 235, and the conductors EGa and EGb may be arranged on the back surface side of the substrate 235.

Similarly to the first embodiment, in the fourth embodiment, the comparator circuit 551 of the safety circuit in which the relay RL1 and the relay RL2 are used compares the threshold voltage and the detected voltage Th1-*i* of the thermistor T1-*i* (i is 1, 3, 4, 6, or 7). However, the thermistor T1-*i* has manufacturing variation. That is, a resistance of the thermistor T1-*i* at a given temperature has individual variability. The larger the manufacturing variation, the greater the detected voltage Th1-*i* of the thermistor T1-*i* deviates from an ideal value. Therefore, conventionally, it is difficult to minimize the safety circuit for the thermistor T1-*i* whose manufacturing variation is large.

Also in the fourth embodiment, hardware correction is applied to the thermistor T1-*i* and software correction is applied to the thermistor T2-*j* (j is 2, 4, or 5). Therefore, manufacturing variations of the thermistor T1 and the thermistor T2 are absorbed, and temperature detection accuracy is improved. Hardware correction and software correction are as described in the first embodiment. Similarly to the first embodiment, the thermistors T1-1, T1-3, T1-4, T1-6, and T1-7 on which hardware correction have been applied are connected to the safety circuit in which the relay RL1 and the relay RL2 are used. The thermistors T2-2, T2-4, and T2-5 on which software correction have been applied are not connected to the safety circuit. The reason thereof is similar to that of the first embodiment.

According to the fourth embodiment, the thermistors T1 and T2 arranged on the substrate 235 of the heater 1000 are connected to the temperature detection circuit 1303, which is insulated from the primary side circuit 1301 and the secondary side circuit 1302. The temperature detection circuit 1303 and the secondary side circuit 1302 are connected to the capacitor C3. Thus, the variation in the potential of the film 202 for when an excessive voltage is generated is reduced. As a result, both downsizing of the fixing apparatus 50 and protection of the fixing apparatus 50 from an excessive voltage are achieved.

Further, a configuration capable of absorbing the manufacturing variations of the thermistors T1-1, T1-3, T1-4, T1-6, and T1-7 and the thermistors T2-2, T2-4, and T2-5 formed by printing on the heater 1000 is employed. Therefore, high temperature detection accuracy is realized, and the safety of the fixing apparatus 50 is improved.

<Technical Concepts Derived from Embodiments>

[Item 1]

The frame ground 239 is an example of a metal frame. The photosensitive member 19 and the like are an example of an image forming unit. The resistance heating elements 232, 233, 2*a*, and 2*b* are examples of a heating element. The surface protective layer 237 is an example of an insulating layer covering the heating element. The conductors 234, 734, EGa, and EGb are examples of a conductive layer contacting the insulating layer. The film 202 is an example of a (flexible) tube-shaped member to be heated by the heating element. The pressing roller 208 is an example of a pressing member. The capacitors 236 and C3 are examples of a capacitive element. These make it possible to achieve both protection of the fixing apparatus 50 from an overvoltage and downsizing of the fixing apparatus 50 and the image forming apparatus 100.

A surge voltage (e.g., Vsurge) applied between the heating element and the metal frame may be divided by a capacitance (e.g., Cx or C3) of the capacitive element, a capacitance (e.g., Chg) between the heating element and the conductive layer, a capacitance (e.g., Cfg) between the conductive layer and the tube-shaped member, and a capacitance (e.g., Chf) between the tube-shaped member and the heating element.

This may shorten a creepage distance and a clearance distance between the frame (e.g., the frame ground 239) and the film 202 and downsize the fixing apparatus 50 and the image forming apparatus 100.

[Item 2]

Item 2 corresponds to the structure illustrated in FIG. 2 and FIGS. 4A and 4B. When this structure is employed, the distance between the tube-shaped member and the conductive layer is shortened, and so, an electrostatic capacitance between the tube-shaped member and the conductive layer is increased.

[Item 3]

Item 3 corresponds to the structure described in FIGS. 6A and 6B. When this structure is employed, it is easy to shorten the distance between the tube-shaped member and the conductive layer, and so it may be easy to increase the electrostatic capacitance between the tube-shaped member and the conductive layer.

[Item 4]

The conductive layer may be arranged outside of a first insulating layer and so as to contact the first insulating layer. This corresponds to a structure illustrated in FIG. 7 and FIGS. 8A and 8B. When this structure is employed, it is easy to shorten the distance between the tube-shaped member and the conductive layer, and so it may be easy to increase the electrostatic capacitance between the tube-shaped member and the conductive layer.

A first terminal configured to supply power to a first heating element and a second terminal configured to supply power to a second heating element may be arranged on one end portion side between two end portions in a longitudinal direction of a substrate. This structure is illustrated in FIGS. 4B, 6B, and 8B. This makes it easy to maintain a path for supplying power to the first heating element (e.g., the resistance heating element 232) and the second heating element (e.g., the resistance heating element 233).

A terminal for connecting with the capacitive element may be arranged on the other end portion side in the longitudinal direction of the substrate. This structure is illustrated in FIGS. 4B, 6B, and 8B. This makes it such that both end portions in the longitudinal direction of the heaters 230 and 730 are effectively utilized.

[Item 5]

A first detection element (e.g., the thermistor T1) and a second detection element (e.g., the thermistor T2) configured to detect a temperature of the heating element may be provided. A temperature control circuit (e.g., the CPU 510) configured to control the temperature of the heating element based on a detection result of the first detection element may be provided. A breaker element (e.g., the relay 530) configured to forcibly cut off power to be supplied to the heating element when the detection result of the first detection element is a detection result indicating that a predetermined event has occurred may be provided. A correction circuit (e.g., the variable resistor 562) configured to correct the detection result of the first detection element according to an individual variability of the first detection element may be provided. A computation circuit (e.g., the CPU 510) configured to correct by computation a detection result of the second detection element depending on an individual variability of the second detection element may be provided.

A speed control circuit (e.g., the CPU 510) configured to lower a throughput or a conveyance speed of a sheet when the detection result of the second detection element is a detection result indicating that a second event has occurred may further be provided.

The detection result of the second detection element corrected by the computation circuit is not used for the forced cut-off of power to be supplied to the heating element (a safety operation). That is, the detection result of the first detection element corrected by the correction circuit is used for the forced cut-off of power to be supplied to the heating element (the safety operation). This makes it possible to reduce the manufacturing cost and suitably protect the fixing apparatus 50. The detection result of the second detection element corrected by the computation circuit may be used for throughput control (speed control). A throughput is, for example, the number of sheets on which an image is formed per unit time. The throughput is controlled, for example, by changing the conveyance speed of the sheet or by changing an interval between a preceding sheet and a succeeding sheet while maintaining the conveyance speed.

[Item 6]

The correction circuit may include a fixed resistance element (e.g., the resistor 561) connected in series with the first detection element and a variable resistance element (e.g., the variable resistor 562) connected in parallel with the fixed resistance element. The detection result of the first detection element is corrected by a resistance of the variable resistance element being changed. The correction circuit may thus be realized by a simple circuit.

[Item 7]

The computation circuit may include a storage circuit (e.g., the memory 511) storing a correction coefficient (e.g., the deviation amount D). The detection result of the second detection element may be corrected using the correction coefficient. The detection result of the second detection element is thus corrected by computation, and so it becomes possible to reduce the manufacturing cost.

[Item 8]

The first detection element may be arranged farther on a downstream side than the second detection element in the conveyance direction of the sheet. This structure is illustrated in FIG. 11B. In the heaters 230, 730, and 1000, a temperature on the downstream side is higher than a temperature on an upstream side in the conveyance direction of the sheet P. Accordingly, by arranging the first detection element on the downstream side, it becomes possible to detect an excessive rise in temperature early.

The temperature detection circuit including the first detection element and the second detection element may be arranged so as to contact the insulating layer. The temperature detection circuit may be electrically insulated from both a primary side circuit including the heating element and a secondary side circuit electrically insulated from the primary side circuit. The conductive layer (e.g., the conductors EGa and EGb) may be electrically connected to the first detection element and the second detection element.

[Item 9]

The capacitive element may be provided inside the fixing apparatus.

[Item 10]

The capacitive element may be provided outside the fixing apparatus.

[Item 11]

The detection result of the second detection element corrected by the computation circuit is used for the speed control and is not used for the forced cut-off of power to be supplied to the heating element (the safety operation). That is, the detection result of the first detection element corrected by the correction circuit is used for the forced cut-off of power to be supplied to the heating element (the safety operation). This makes it possible to reduce the manufacturing cost and suitably protect the fixing apparatus 50.

A throughput control circuit configured to lower the throughput of the sheet based on the detection result of the second detection element corrected by the computation circuit may be provided.

[Item 12]

The correction circuit may include a fixed resistance element connected in series with the first detection element and a variable resistance element connected in parallel with the fixed resistance element. The detection result of the first detection element may be corrected by a resistance of the variable resistance element being changed. The correction circuit may thus be realized by a simple circuit.

[Item 13]

The computation circuit may include a storage circuit storing a correction coefficient. The detection result of the second detection element may be corrected using the correction coefficient. The detection result of the second detection element is thus corrected by computation, and so it becomes possible to reduce the manufacturing cost.

[Item 14]

The first detection element may be arranged farther on a downstream side than the second detection element in the conveyance direction of the sheet. This structure is illustrated in FIG. 11B. In the heaters 230, 730, and 1000, a temperature on the downstream side is higher than a temperature on an upstream side in the conveyance direction of the sheet P. Accordingly, by arranging the first detection element on the downstream side, it becomes possible to detect an excessive rise in temperature early.

[Item 15]

The first detection element and the second detection element may detect a temperature of the substrate including the heating element, the tube-shaped member, or the pressing member in a form in which the elements are in contact with or not in contact with them.

[Item 16]

The heating element may be formed on a first surface of the substrate. The first detection element and the second detection element may be formed by printing on a second surface of the substrate, the second surface being different from the first surface.

[Item 17]

The primary side circuit including the heating element may be provided. The secondary side circuit insulated from the primary side circuit and configured to control power to be supplied to the heating element from an alternating current power source based on a temperature of the fixing apparatus detected by the temperature detection circuit may be provided. The temperature detection circuit is insulated from the primary side circuit. The temperature detection circuit is also insulated from the secondary side circuit.

[Item 18]

A capacitive element (e.g., the capacitor C3) whose one end is connected to the metal frame and whose other end is connected to the temperature detection circuit may be provided. This structure has been described in the fourth embodiment. By thus connecting the capacitive element (e.g., the capacitor C3) between the metal frame and the temperature detection circuit, the protection of the fixing apparatus 50 from an overvoltage and downsizing of the fixing apparatus 50 may both be achieved.

[Item 19]

An insulation is applied between the temperature detection circuit and the primary side circuit, and an insulation is applied between the temperature detection circuit and the secondary side circuit. This structure is illustrated in FIG. 16. By thus applying the insulations (e.g., reinforced insulations), the safety of the image forming apparatus 100 is further improved.

[Item 20]

The capacitive element may be connected to the metal frame via the secondary side circuit. As illustrated in FIG. 13, the capacitive element (e.g., the capacitor C3) may be connected to the frame ground 239 via the ground potential GND-2 of the secondary side circuit 1302. The conductors EGa and EGb of the temperature detection circuit 1303 are connected to the ground potential GND-3 of the temperature detection circuit 1303. The capacitive element (e.g., the capacitor C3) connects the ground potential GND-2 of the secondary side circuit 1302 and the ground potential GND-3 of the temperature detection circuit 1303. Accordingly, the capacitive element (e.g., the capacitor C3) connects the frame ground 239 and the conductors EGa and EG.

The fixing apparatus may include a conductor (e.g., EGa and EGb) provided on the substrate on which the heating element and the detection circuit are provided, the conductor being connected to the detection circuit. The capacitive element may connect the conductor provided on the substrate and the metal frame via the secondary side circuit and the temperature detection circuit. This is illustrated in FIG. 13. By the electrostatic capacitance Cfg being generated between the conductors EGa and EGb of the temperature detection circuit 1303 and the film 202, it becomes easy to prevent an overvoltage. As a result, it becomes possible to shorten the creepage distance and the clearance distance between the film 202 and the frame ground 239, and downsizing of the fixing apparatus 50 (image forming apparatus 100) may be realized.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-091073, filed Jun. 3, 2022 which is hereby incorporated by reference herein in its entirety.

What is claimed is:

1. An image forming apparatus comprising:

a metal frame configured to provide a ground potential;

an image forming unit configured to form a toner image on a sheet;

a fixing apparatus configured to fix the toner image on the sheet, the fixing apparatus comprising:

a heater, the heater including a substrate, a heating element configured to generate heat by being supplied with power from an alternating current power source and provided on a first surface side of the substrate, a first insulating layer provided on the first surface side of the substrate and covering the heating element, a conductive layer provided on a second surface side of the substrate opposite from the first surface side of the substrate, and a second insulating layer provided on the second surface side of the substrate and covering the conductive layer;

a tube-shaped member configured to be heated by the heating element;

a pressing member arranged opposing the tube-shaped member and configured to form a nip portion in cooperation with the tube-shaped member; and a capacitive element whose one end is connected to the metal frame and whose other end is connected to the conductive layer of the fixing apparatus, wherein the second surface side of the substrate opposes an inner circumferential surface of the tube-shaped member, and wherein the inner circumferential surface of the tube-shaped member slides with the second insulating layer.

* * * * *